United States Patent
Kobayashi

(10) Patent No.: US 12,416,794 B2
(45) Date of Patent: Sep. 16, 2025

(54) OPTICAL SYSTEM AND IMAGING APPARATUS

(71) Applicant: TAMRON CO., LTD., Saitama (JP)

(72) Inventor: Tomohiro Kobayashi, Saitama (JP)

(73) Assignee: TAMRON CO., LTD., Saitama (JP)

( * ) Notice: Subject to any disclaimer, the term of this patent is extended or adjusted under 35 U.S.C. 154(b) by 434 days.

(21) Appl. No.: 17/948,671

(22) Filed: Sep. 20, 2022

(65) Prior Publication Data

US 2023/0152560 A1    May 18, 2023

(30) Foreign Application Priority Data

Nov. 12, 2021  (JP) .................................. 2021-184724

(51) Int. Cl.
*G02B 15/14*    (2006.01)
*G02B 15/20*    (2006.01)

(52) U.S. Cl.
CPC ..... *G02B 15/145121* (2019.08); *G02B 15/20* (2013.01)

(58) Field of Classification Search
CPC ........... G02B 15/145121; G02B 15/20; G02B 15/14; G02B 15/144
See application file for complete search history.

(56) References Cited

U.S. PATENT DOCUMENTS

| | | | |
|---|---|---|---|
| 2013/0286276 A1* | 10/2013 | Kawamura | G02B 15/1461 348/345 |
| 2014/0267877 A1* | 9/2014 | Nakagawa | G02B 15/145121 359/683 |
| 2017/0108678 A1* | 4/2017 | Miyazawa | G02B 15/20 |
| 2018/0017771 A1* | 1/2018 | Kawamura | G02B 27/646 |
| 2021/0072505 A1 | 3/2021 | Kobayashi | |
| 2025/0110319 A1* | 4/2025 | Fujisaki | G02B 27/0025 |

FOREIGN PATENT DOCUMENTS

| | | |
|---|---|---|
| JP | 2020-060661 A | 4/2020 |
| JP | 2021-039304 A | 3/2021 |

* cited by examiner

*Primary Examiner* — George G. King
*Assistant Examiner* — Anna Smith
(74) *Attorney, Agent, or Firm* — Paratus Law Group, PLLC

(57) ABSTRACT

The optical system includes a plurality of lens groups in which an interval between adjacent lens groups changes when focusing, and an aperture stop, and when intervals between an exit pupil of an on-axis ray by the aperture stop and an image plane in an infinite-distance object focusing state, a first short-distance object focusing state in which an imaging magnification is β1, and a second short-distance object focusing state in which an imaging magnification is β2 are Pinf, P1, and P2, respectively, the optical system satisfies predetermined conditions. An imaging apparatus includes the optical system and an image sensor.

9 Claims, 16 Drawing Sheets

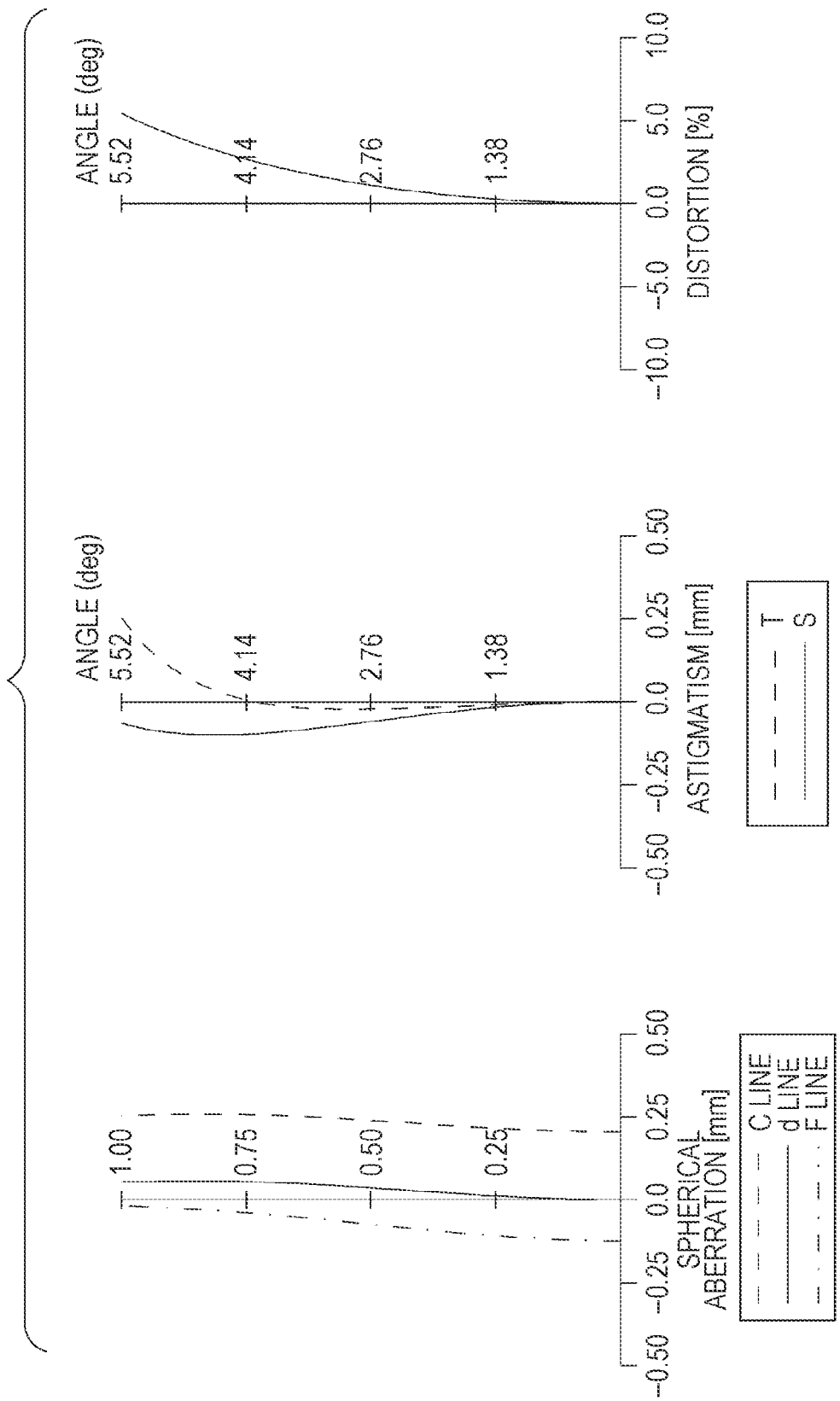

OPTICAL SYSTEM AND IMAGING APPARATUS

CROSS-REFERENCE TO RELATED APPLICATIONS

This application is based on and claims the benefit of priority from Japanese Patent Application No. 2021-184724, filed on Nov. 12, 2021, the entire contents of which are incorporated herein by reference.

BACKGROUND OF THE INVENTION

Technical Field

The invention of the present application relates to an optical system and an imaging apparatus, and particularly relates to an optical system and an imaging apparatus suitable for an imaging apparatus using a solid-state image sensor (CCD, CMOS, or the like) such as a digital still camera or a digital video camera.

Related Art

Conventionally, imaging apparatuses using various solid-state image sensors such as video cameras, digital still cameras, single lens reflex cameras, and mirrorless cameras have been widely used. With the progress of high performance and downsizing of these imaging apparatuses, further high performance and downsizing of the imaging lenses (optical system) are also required, and macro lenses are no exception. The macro lens generally refers to an imaging lens having a maximum imaging magnification of 0.5 times to 1 time.

The macro lens is required to achieve high optical performance over the entire focusing region by suppressing, in particular, aberration variation during focusing, for example, spherical aberration and field curvature variation. However, most of currently commercially available macro lenses have about F 2.8. The zoom lenses also make it possible to achieve a similar imaging magnification with a brightness of about F 2.8, and the zoom lenses may be used as a substitute for the macro lenses. Therefore, the macro lenses have been required to be smaller in size, higher in performance, and higher added value products in which imaging expression unique to the macro lenses is pursued.

As such macro lenses, optical systems disclosed in JP 2021-39304 A and JP 2020-60661 A are known.

The optical system disclosed in JP 2021-39304 A includes a front group having positive refractive power, and a rear group having negative refractive power in order from the object side to the image side. While focusing, the rear group is stationary and the front lens is moved to the object side along the optical axis direction as a focus group, so that the subject is focused.

The optical system disclosed in JP 2020-60661 A includes a plurality of lens groups and is configured such that distances between adjacent lens groups change while focusing. The optical system adopts a floating focus method, and focuses on the subject by moving a second lens group having negative refractive power and a fourth lens group having positive refractive power along an optical axis direction.

SUMMARY OF THE INVENTION

However, although the optical system disclosed in JP 2021-39304 A has F 2.0 and achieves a large aperture ratio, since the weight and the movement amount of the focus group are large, it is difficult to further improve the imaging magnification and the focus speed while suppressing an increase in size of the macro lens.

In the optical system disclosed in JP 2020-60661 A, strong positive refractive power is provided in the third lens group to reduce the diameter of the fourth lens group, which is a focus group. In this case, in order to further increase the aperture and improve the imaging magnification, it is necessary to increase the number of lenses constituting another lens group in order to favorably correct the aberration generated in the third lens group, and the optical system becomes large.

Therefore, an object of the present invention is to provide an optical system and an imaging apparatus that have a larger aperture and a higher imaging magnification while maintaining a small overall size.

In order to solve the above problem, an optical system according to the invention of the present application is an optical system including a plurality of lens groups in which an interval between adjacent lens groups changes when focusing, and an aperture stop, and when intervals between an exit pupil of an on-axis ray by the aperture stop and an image plane in an infinite-distance object focusing state, a first short-distance object focusing state in which an imaging magnification is β1, and a second short-distance object focusing state in which an imaging magnification is β2 are Pinf, P1, and P2, respectively, the optical system satisfies the following conditions:

$$|\beta 1|<|\beta 2| \tag{1}$$

$$|P\text{inf}|<|P1| \tag{2}$$

$$|P2|<|P1| \tag{3}$$

Where, |β2|≤|βmax| is established when the imaging magnification (maximum imaging magnification) at the time of the closest focusing state in the optical system is βmax.

In order to solve the above problem, the imaging apparatus according to the invention of the present application includes the optical system and an image sensor that converts an optical image formed by the optical system into an electrical signal.

According to the invention of the present application, it is possible to provide an optical system and an imaging apparatus that have a larger aperture and a higher imaging magnification while maintaining a small overall size.

BRIEF DESCRIPTION OF THE DRAWINGS

FIG. 16 is a spherical aberration diagram, an astigmatism diagram, and a distortion diagram in the second short-distance object focusing state of the optical system of the fourth example.

DESCRIPTION OF THE EMBODIMENTS

Figure 1:
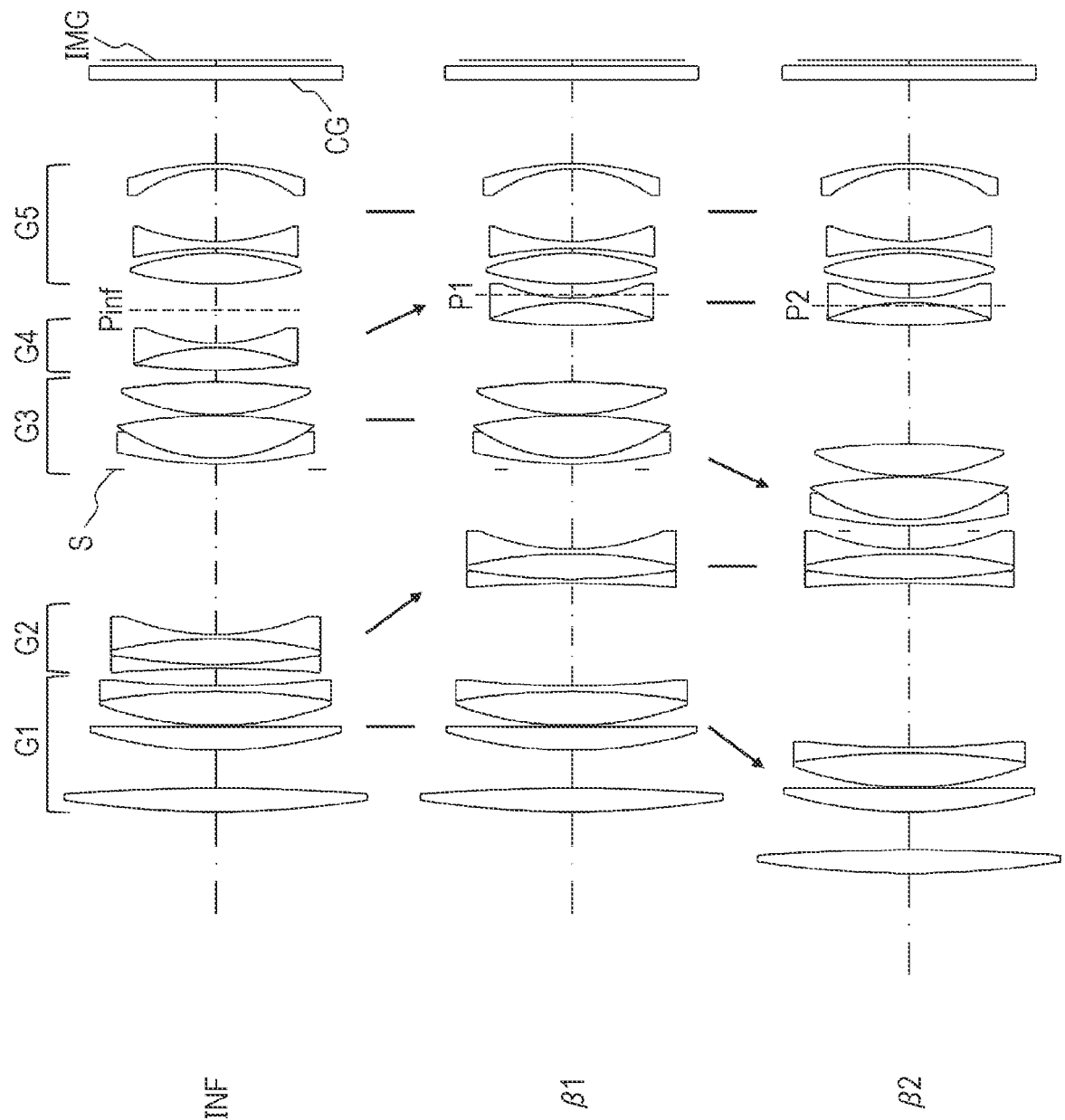
FIG. 1 is a lens cross-sectional view of an optical system of a first example of the present invention, where an upper part shows an infinite-distance object focusing state, a middle part shows a first short-distance object focusing state (imaging magnification β1), and a lower part shows a second short-distance object focusing state (imaging magnification β2) (hereinafter, the same applies to the lens cross-sectional views)

An embodiment of the optical system and the imaging apparatus according to the invention of the present application will be described below. However, the optical system and the imaging apparatus described below are one aspect of the optical system and the imaging apparatus according to the invention of the present application, and the optical system and the imaging apparatus according to the invention of the present application are not limited to the following aspect.

1. Optical System

The optical system includes a plurality of lens groups in which an interval between adjacent lens groups changes during focusing, and an aperture stop. Here, the "lens group" refers to a group including one or a plurality of lenses arranged adjacent to each other, and an air interval between the lens groups adjacent to each other changes when focusing. Mention of "one lens group" assumes that an air interval of each lens included in the "one lens group" does not change when focusing. Hereinafter, a lens group that moves in the optical axis direction when focusing is referred to as a focus group. Since the optical system includes at least one focus group, the optical system includes at least two lens groups. Hereinafter, conditional expressions that should be or preferably are satisfied by the optical system and operations when focusing will be described.

1-1. Conditional Expressions 1-1-1. Conditional Expressions (1) to (3)

When intervals between an exit pupil of an on-axis ray by the aperture stop and an image plane in an infinite-distance object focusing state, a first short-distance object focusing state in which an imaging magnification is $\beta1$, and a second short-distance object focusing state in which an imaging magnification is $\beta2$ are Pinf, P1, and P2, respectively, the optical system satisfies the following conditions:

$$|\beta1|<|\beta2| \quad (1)$$

$$|Pinf|<|P1| \quad (2)$$

$$|P2|<|P1| \quad (3)$$

Where, $|\beta2|\leq|\beta max|$ is established when the imaging magnification (maximum imaging magnification) at the time of the closest focusing state in the optical system is $\beta max$.

The first short-distance object focusing state means a state in which a subject image having a size of $|\beta1|$ times the actual size of the subject is formed on an image plane when the target subject is focused at a first imaging distance. The second short-distance object focusing state means a state in which a subject image having a size of $|\beta2|$ times the actual size of the subject is formed on an image plane when the target subject is focused at a second imaging distance.

In the optical system, when focusing from an infinite-distance object to a short-distance object, an interval between adjacent lens groups is changed to focus on a target subject. If the above conditional expressions (1) to (3) are satisfied according to the imaging distance at that time, the exit pupil position moves to the image side when focusing from the infinite-distance object to the first short-distance object. When focusing from the first short-distance object to the second short-distance object, the exit pupil position moves to the object side. Thus, since the exit pupil position is moved to the image side once and then moved to the object side when focusing from the infinite-distance object to the second short-distance object, variation in the exit pupil position when focusing is reduced when viewed in the entire focusing region, and the image plane variation when focusing can be suppressed. Therefore, it is possible to reduce the number of lenses required for aberration correction, and even when the maximum imaging magnification is increased, it is possible to obtain an optical system having high imaging performance in a state where the entire optical system is kept small.

By satisfying the conditional expressions (2) and (3), the position of the exit pupil can be prevented from greatly varying from the position in the infinite-distance object focusing state even when imaging is performed while approaching the subject (also when the imaging magnification is larger than ($\beta1$). As described above, since the high imaging performance can be obtained with a small number of lenses, a decrease in brightness due to an increase in the number of lenses can also be suppressed. These make it also easy to increase the aperture in a state where the entire size is kept small.

As described above, by satisfying the above conditional expressions (1) to (3), it is possible to obtain an optical system having a larger aperture and a higher imaging magnification while maintaining a small overall size.

1-1-2. Conditional Expressions (4) and (5)

In the optical system, it is preferable that the first imaging magnification β1 and the second imaging magnification β2 satisfy the following conditions, respectively.

$$|β1|>0.2 \quad (4)$$

$$|β2|≥0.8 \quad (5)$$

In a case where the conditional expression (5) is satisfied, the optical system can be a macro lens having a maximum imaging magnification of 0.8 times or more. At that time, by satisfying the conditional expression (4), even when the optical system has a large maximum imaging magnification, it is possible to sufficiently obtain the effects obtained by satisfying the above conditional expressions (1) to (3), and it is possible to achieve a large-aperture optical system having high imaging performance in a state where the entire optical system is kept small.

In order to obtain the above effects, a lower limit value of the conditional expression (4) is more preferably 0.25, still more preferably 0.3, and yet more preferably 0.4. An upper limit value of the conditional expression (4) is required to be less than |β2| as defined in the conditional expression (1). When the optical system satisfies the conditional expression (5), the upper limit value of the conditional expression (4) is preferably 0.7, and more preferably 0.6. The lower limit value of the conditional expression (5) is more preferably 0.85, still more preferably 0.9, and yet more preferably 0.95. In the conditional expressions (4) and (5), the inequality sign (<) may be replaced with an inequality sign with an equal sign (≤). Regarding the upper limit value of the conditional expression (4), the numerical value of the conditional expression (4) may be equal to or less than the numerical value listed above, or may be less than the numerical value listed above.

1-2. Operation at the Time of Focusing

In the optical system, the subject is focused by moving any one or more lens groups along the optical axis direction. At that time, as long as the conditional expressions (1) to (3) are satisfied, the operation at the time of focusing in the optical system is not particularly limited, but the following is preferable.

1-2-1. From Infinite-Distance Object Focusing State to First Short-Distance Object Focusing State During the period from the infinite-distance object focusing state to the first short-distance object focusing state, it is preferable to focus on the subject as follows.

(1) Inner Focus Method

First, the lens group (most-object-side lens group) arranged on the most object side in the optical system is preferably fixed in the optical axis direction during the period from the infinite-distance object focusing state to the first short-distance object focusing state. That is, it is preferable to focus on the subject by the inner focus method during the period from the infinite-distance object focusing state to the first short-distance object focusing state.

When the inner focus method is adopted, a lens group that is small in size and light in weight compared with the most-object-side lens group can be used as a focus group. Therefore, it becomes easy to achieve high-speed autofocus. As compared with a case where the most-object-side lens group is used as the focus group, it becomes easy to suppress variation in the angle of view when focusing. At the time of imaging a moving image, imaging a live view, or the like, while vibrating (wobbling) the focus group at a high speed in the optical axis direction with a slight amplitude, an optimum position of the focus group is obtained so as to be in a focusing state with respect to the target subject, and the focus group is moved to the optimum position. At that time, use of the inner focus method makes it possible to suppress the variation in the angle of view due to the vibration of the focus group at the time of wobbling. Therefore, it is possible to suppress the variation in the size of the subject image at the time of wobbling and to prevent the user from having a feeling of uncomfortable at the time of imaging a moving image, imaging a live view, or the like.

(2) Floating Method

It is preferable to perform focusing by moving two lens groups in the optical axis direction during the period from the infinite-distance object focusing state to the first short-distance object focusing state. At this time, an aperture stop is preferably disposed between these two lens groups.

In this manner, it is possible to focus on the subject by so-called floating focus during the period from the infinite-distance object focusing state to the first short-distance object focusing state, and it is possible to suppress aberration variation when focusing.

(3) Single Lens Element

During the period from the infinite-distance object focusing state to the first short-distance object focusing state, it is preferable that a lens group including a single lens element is set as a focus group, and the focus group is moved in the optical axis direction to focus on the subject. That is, the lens group functioning as the focus group during the period from the infinite-distance object focusing state to the first short-distance object focusing state preferably includes a single lens element.

Here, the "single lens element" refers to an element including only one lens or only one cemented lens obtained by cementing a plurality of lenses. By using, as a focus group, a lens group including a single lens element during the period from the infinite-distance object focusing state to the first short-distance object focusing state, it is possible to reduce the size and weight of the focus group, and to achieve high-speed autofocus. By reducing the size and weight of the focus group, it is possible to reduce the size and weight of a drive mechanism for driving the focus group, and it is possible to reduce the size and weight of the entire lens unit.

1-2-2. Period from First Short-Distance Object Focusing State to Second Short-Distance Object Focusing State During the period from the first short-distance object focusing state to the second short-distance object focusing state, it is preferable to perform focusing by moving the plurality of lens groups along the optical axis direction on the same locus.

In this manner, it is possible to simultaneously move a plurality of lens groups by fixing the plurality of lens groups to the same lens frame and driving the lens frame by one drive mechanism. In this case, it is not necessary to provide a drive mechanism for each lens group, and it is possible to simplify the focus drive mechanism, so that it is possible to compactly configure the entire lens unit. The plurality of lens groups may be two lens groups or three or more lens groups.

1-2-3. Most-Object-Side Lens Group

As described above, it is preferable to focus on the subject by the inner focus method during the period from the infinite-distance object focusing state to the first short-distance object focusing state, and it is preferable to fix the most-object-side lens group in the optical axis direction in the optical system.

During the period from the first short-distance object focusing state to the second short-distance object focusing state, the most-object-side lens group may be configured as a fixed lens group or may be configured as a focus group when focusing.

When the most-object-side lens group is set as a fixed lens group also during the period from the first short-distance object focusing state to the second short-distance object focusing state, it is possible to focus on the subject by the inner focus method during that period. Therefore, it is possible to reduce the size and weight of the focus group, it is possible to simplify the drive mechanism for driving the focus group, and it is possible to compactly configure the entire lens unit. Since the barrel length does not change when focusing, the object side of the barrel can have a sealed structure, and it becomes easy to give the barrel a waterproof structure and a dustproof structure.

On the other hand, during the period from the first short-distance object focusing state to the second short-distance object focusing state, if the most-object-side lens group is set as the focus group and the most-object-side lens group is moved in the optical axis direction to focus on the subject, it becomes easy to downsize the entire configuration while improving the maximum imaging magnification and shortening the shortest imaging distance. This is for the following reason.

First, in a case where the most-object-side lens group is a fixed lens group in the entire focusing region, restrictions on the optical configuration occur, and it becomes difficult to shorten the shortest imaging distance and improve the maximum imaging magnification while maintaining a small overall size. On the other hand, if the most-object-side lens group is extended to, for example, the object side according to the imaging distance when focusing, the degree of freedom of the optical configuration becomes increased, and it becomes easy to shorten the shortest imaging distance and improve the maximum imaging magnification. By moving the most object side to the image side when not performing imaging, it becomes easy to downsize the entire configuration.

When the imaging magnification is small, it is relatively easy to image the subject in a state of focusing on the object point intended by the user even if the autofocus method is adopted. However, when the subject is approached and imaged at a large imaging magnification, it is generally difficult to focus on the object point intended by the user in the autofocus method. Therefore, high-speed autofocus is achieved by fixing the most-object-side lens group in the optical axis direction and focusing on the subject by the inner focus method during the period from the infinite-distance object focusing state to the first short-distance object focusing state, and the user's usability is also improved by focusing on the subject by the manual focus method during the period from the first short-distance object focusing state to the second short-distance object focusing state. During the period from the first short-distance object focusing state to the second short-distance object focusing state, if the most-object-side lens group is extended forward by the cam mechanism provided in the barrel, it is not necessary to provide a focus drive mechanism for driving the most-object-side lens group, and it is possible to reduce the size and weight of the entire lens unit.

1-2-4. Final Lens Group

The lens group (final lens group) arranged on the most image plane side in the optical system is preferably fixed in the optical axis direction when focusing. By using the final lens group as a fixed lens group in this manner, it is not necessary to arrange the drive mechanism for driving the final lens group on the image plane side, and thus, it is possible to simplify the barrel structure. By using the final lens group as a fixed lens group, the image plane side of the barrel can have a sealed structure, and it is possible to prevent dust, water, and the like from entering from the image plane side.

However, the final lens group is not limited to the fixed lens group, and the final lens group may be used as the focus group. For example, during the period from the first short-distance object focusing state to the second short-distance object focusing state, the most-object-side lens group may be fixed in the optical axis direction, and the final lens group may be moved along the optical axis direction to focus on the subject.

1-2-5. Lens Group Configuration

The lens group configuration in the optical system is not particularly limited, but it becomes easy to obtain an optical system satisfying the conditional expressions (1) to (3) by using different lens groups as the focus group between during the period from the infinite-distance object focusing state to the first short-distance object focusing state and during the period from the first short-distance object focusing state to the second short-distance object focusing state. Specifically, it is preferable to include a first focus group that moves along the optical axis direction during the period from the infinite-distance object focusing state to the first short-distance object focusing state, and a second focus group that moves along the optical axis direction during the period from the first short-distance object focusing state to the second short-distance object focusing state, the second focus group is fixed in the optical axis direction during the period from the infinite-distance object focusing state to the first short-distance object focusing state, and the first focus group is fixed in the optical axis direction during the period from the first short-distance object focusing state to the second short-distance object focusing state.

When the inner focus method is adopted in the optical system during the period from the infinite-distance object focusing state to the first short-distance object focusing state as described above, the first focus group is required to be a lens group arranged closer to the image plane side than the most-object-side lens group. When the floating focus method is adopted, it is required to include two or more first focus groups, and it is preferable that an aperture stop is disposed between the first focus groups. The first focus group preferably includes a single lens element.

The optical system preferably includes one or more second focus groups, and for example, a lens group, a most-object-side lens group, and the like arranged between the first focus group and the first focus group can be used as the second focus group.

2. Imaging Apparatus

Next, the imaging apparatus according to the invention of the present application will be described. The imaging apparatus according to the invention of the present application includes an imaging lens according to the invention of the present application and an image sensor that converts an optical image formed by the imaging lens into an electrical signal. The image sensor is preferably provided on the image side of the optical system.

Here, the image sensor and the like are not particularly limited, and a solid-state image sensor such as a charge coupled device (CCD) sensor and a complementary metal oxide semiconductor (CMOS) sensor can also be used. The imaging apparatus according to the invention of the present application is suitable for an imaging apparatus using these solid-state image sensors such as a digital camera and a video camera. The imaging apparatus can be applied to various imaging apparatuses such as a single lens reflex camera, a mirrorless camera, a digital still camera, a monitoring camera, an in-vehicle camera, and a drone-mounted camera. These imaging apparatuses may be lens interchangeable imaging apparatuses, or may be fixed-lens imaging apparatuses in which the lens is fixed to the housing. In particular, since the imaging lens has a maximum imaging magnification of 0.5 times or more and is suitable as a so-called macro lens capable of imaging in proximity to a subject, the imaging lens is suitable for applications requiring large imaging of a subject such as imaging apparatuses such as single lens reflex cameras and mirrorless cameras, and industrial imaging apparatuses.

Next, the invention of the present application will be specifically described with reference to examples. However, the invention of the present application is not limited to the following examples.

First Example (1) Optical Configuration

FIG. 1 is a lens cross-sectional view of an optical system of a first example of the invention of the present application, where an upper part shows an infinite-distance object focusing state, a middle part shows a first short-distance object focusing state (imaging magnification $\beta1$), and a lower part shows a second short-distance object focusing state (imaging magnification $\beta2$). Hereinafter, since the same applies to the lens cross-sectional views shown in each example, the description will be omitted below.

As illustrated in FIG. 1, the optical system includes a first lens group G1 having positive refractive power, a second lens group G2 having negative refractive power, a third lens group G3 having positive refractive power, a fourth lens group G4 having negative refractive power, and a fifth lens group G5 having positive refractive power in order from the object side. An aperture stop S is disposed on the object side of the third lens group G3. The configuration of each lens group is as illustrated in the drawing.

In the optical system of the first example, the "imaging magnification $\beta1$" is −0.5, the "imaging magnification $\beta2$" is −1.0, and the imaging magnification $\beta2$ corresponds to the maximum imaging magnification $\beta$max in the optical system. In the optical system, the subject is focused by moving the second lens group G2 and the fourth lens group G4 along the optical axis direction during the period from the infinite-distance object focusing state to the first short-distance object focusing state, and the first lens group G1, the third lens group G3, and the fifth lens group G5 are fixed in the optical axis direction during that period. The subject is focused by moving the first lens group G1 and the third lens group G3 with the same locus along the optical axis direction during the period from the first short-distance object focusing state to the second short-distance object focusing state, and the second lens group G2, the fourth lens group G4, and the fifth lens group G5 are fixed in the optical axis direction during that period. The second lens group G2 and the fourth lens group G4 are the first focus group, and the first lens group G1 and the third lens group G3 are the second focus group.

In FIG. 1, "Pinf", "P1", and "P2" indicate exit pupil positions in the infinite-distance object focusing state, the first short-distance object focusing state, and the second short-distance object focusing state, respectively. As illustrated in FIG. 1, variation in the exit pupil position is suppressed in the entire focusing region.

In FIG. 1, "IMG" indicates an image plane, and specifically indicates an imaging plane of a solid-state image sensor such as a CCD sensor and a CMOS sensor, or a film plane of a gelatin silver film, or the like. The object side of IP is provided with a cover glass CG or the like. This point is the same in each lens cross-sectional view shown in other examples, and thus the description will be omitted below.

(2) Numerical Value Example

Next, a numerical example of the optical system will be described. Hereinafter, surface data of the optical system, various data, a variable interval at the time of focusing, and a focal length of each lens group will be described.

In a table representing the surface data, "No." represents the order (surface number) of the lens surface counted from the object side, "R" represents the curvature radius of the lens surface, "D" represents the interval on the optical axis of the lens surface, "Nd" represents the refractive index with respect to a d line (wavelength $\lambda$ is 587.6 nm), and "ABV" represents the Abbe number with respect to the d line. In the field of "No.", "STOP" displayed in the field next to the surface number represents the aperture stop. In the field of "D", "D∞" (D7 or the like in the present example) is displayed to indicate a variable interval at the time of focusing. In each table shown below, the unit of length is all "mm", and the unit of angle of view is all "°". In each table, "∞" represents infinity.

In the table representing various data, "f" is a focal length of the optical system, "β" is an imaging magnification, "Fno" is an F number, "ω" is a half angle of view, "Y" is an image height, "BF" is back focus, and "TL" is an overall optical length, which indicate the values in each of the infinite-distance object focusing state, the first short-distance object focusing state, and the second short-distance object focusing state. However, the values in the table are values including a cover glass (Nd is 1.5168) having a thickness of 2.5 mm, and the same applies to the back focus presented in other examples.

In the table showing the variable interval at the time of focusing, the variable intervals at the time of the infinite-distance object focusing state, the first short-distance object focusing state, and the second short-distance object focusing state are shown together with the focal length (f) and the imaging distance at that time.

The table representing the focal length of each lens group presents the lens surface included in each lens group and the focal length of each lens group.

Numerical values used in the conditional expressions (1) to (5) are shown in Table 1 (shown below). Since the matters related to these tables are the same in each table shown in the other examples, the description will be omitted below.

Figure 2:
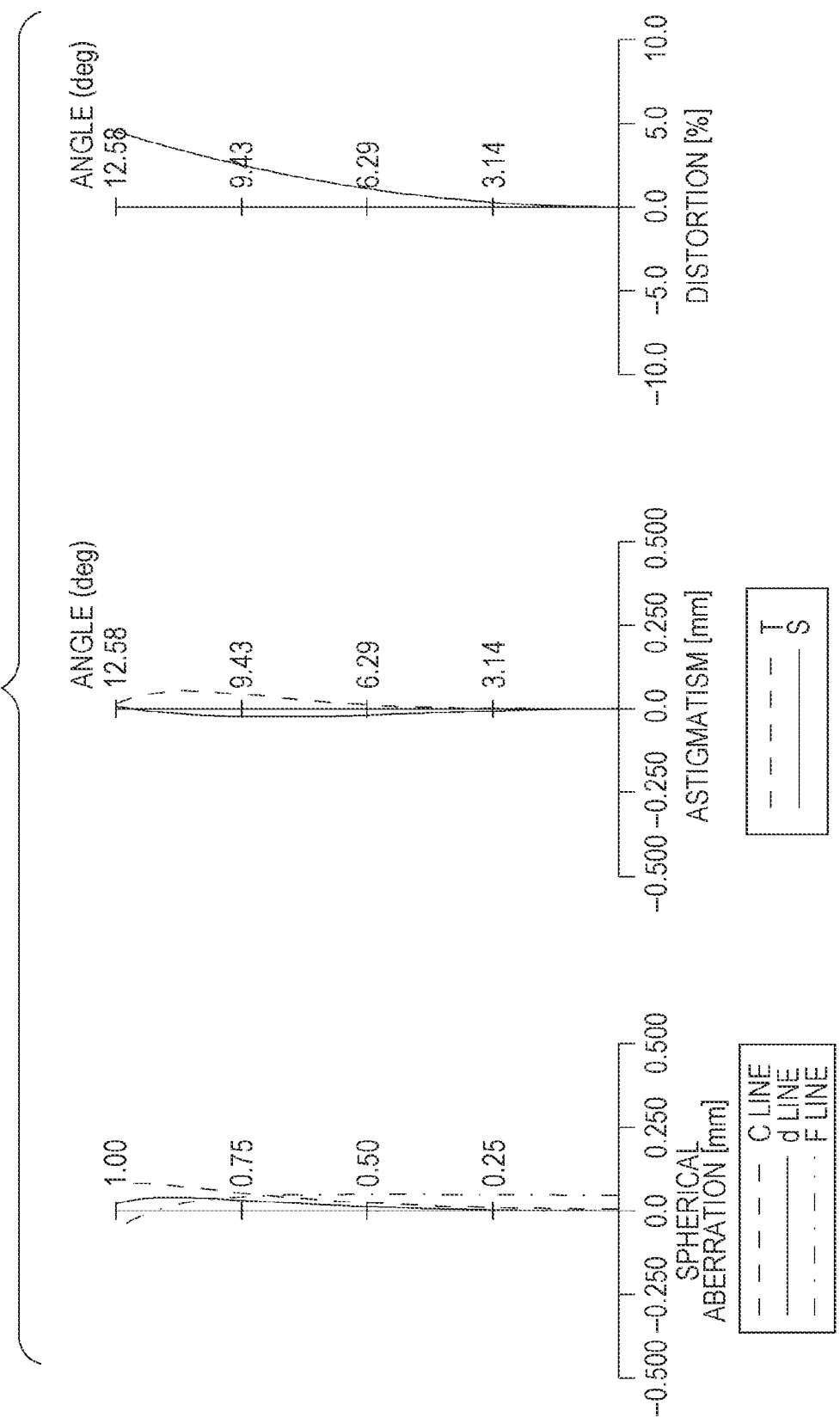
FIG. 2 is a spherical aberration diagram, an astigmatism diagram, and a distortion diagram in the infinite-distance object focusing state of the optical system of the first example.
Figure 3:
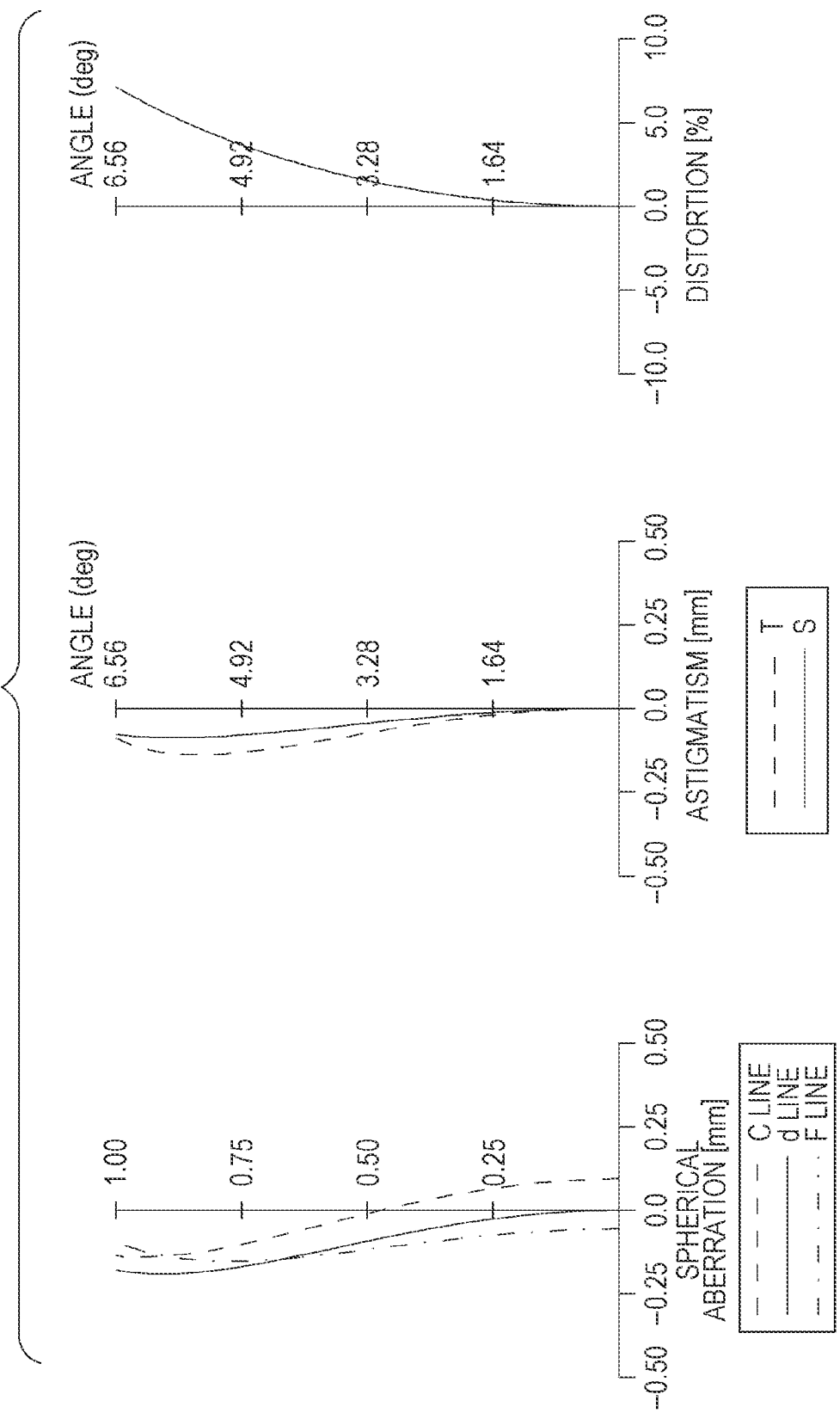
FIG. 3 is a spherical aberration diagram, an astigmatism diagram, and a distortion diagram in the first short-distance object focusing state of the optical system of the first example.
Figure 4:
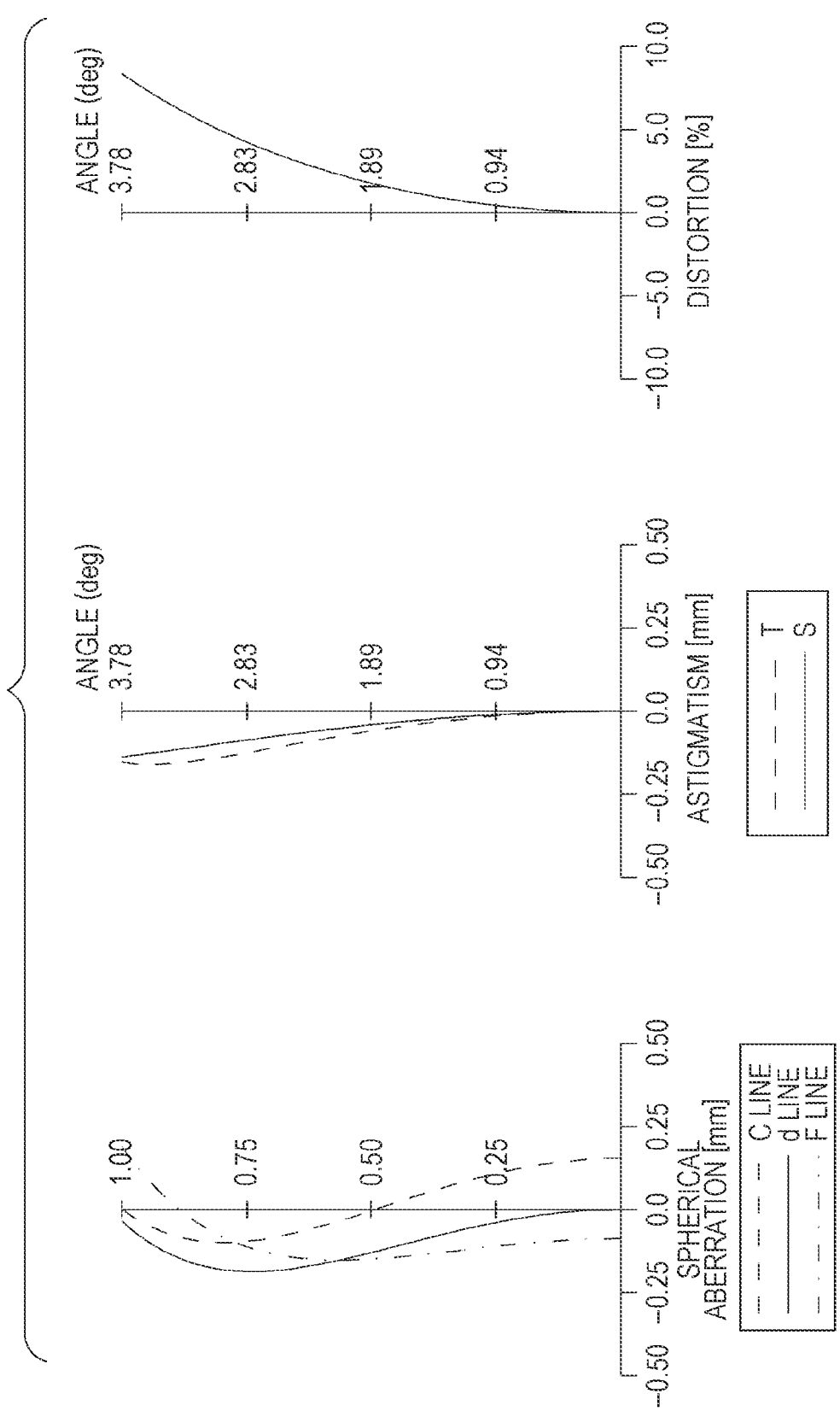
FIG. 4 is a spherical aberration diagram, an astigmatism diagram, and a distortion diagram in the second short-distance object focusing state of the optical system of the first example.

FIGS. 2, 3, and 4 illustrate longitudinal aberration diagrams of the optical system in the infinite-distance object focusing state, the first short-distance object focusing state (imaging magnification $\beta1$), and the second short-distance object focusing state (imaging magnification $\beta2$). In each longitudinal aberration diagram, the spherical aberration, the astigmatism, and the distortion are illustrated in order from the left toward the drawing. In the diagram representing spherical aberration, the vertical axis represents the ratio to the open F number, the horizontal axis represents the defocus, the solid line represents the spherical aberration at the d line (wavelength $\lambda$ is 587.56 nm), the broken line represents the spherical aberration at a C line (wavelength $\lambda$ is 656.28 nm), and the dash-dot line represents the spherical aberration at an F line (wavelength $\lambda$ is 486.13 nm). In the diagram representing astigmatism, the vertical axis represents the half angle of view (ω), the horizontal axis represents defocus, the solid line represents a sagittal image plane with respect to the d line, and the dotted line represents the meridional image plane with respect to the d line. In the diagram representing distortion, the vertical axis represents the half angle of view (ω), and the horizontal axis represents %, which represents the distortion. Since the matters related to these diagrams are the same in the longitudinal aberration diagrams presented in other examples, and thus the description will be omitted below.

(Surface Data)

| No. | R | D | Nd | ABV |
|---|---|---|---|---|
| 1 | 179.9617 | 4.1633 | 1.77250 | 49.62 |
| 2 | −384.0735 | 6.8484 | | |
| 3 | 79.7721 | 4.2145 | 1.49700 | 81.61 |
| 4 | 2266.2517 | 0.2000 | | |
| 5 | 59.6990 | 6.1353 | 1.59282 | 68.62 |
| 6 | −126.8915 | 1.0000 | 1.84666 | 23.78 |
| 7 | 169.6620 | D7 | | |
| 8 | −250.8703 | 0.8000 | 1.80400 | 46.53 |
| 9 | 106.3512 | 4.5353 | 1.92286 | 20.88 |
| 10 | −86.6084 | 0.8000 | 1.83481 | 42.74 |
| 11 | 43.7378 | D11 | | |
| 12STOP | ∞ | 1.0000 | | |
| 13 | 77.9391 | 1.0000 | 1.76174 | 26.71 |
| 14 | 30.2075 | 7.6150 | 1.51106 | 77.74 |
| 15 | −89.5658 | 0.2000 | | |
| 16 | 38.8444 | 5.7779 | 1.62620 | 59.44 |
| 17 | −122.0103 | D17 | | |
| 18 | ∞ | 0.0000 | | |
| 19 | 116.2374 | 4.0000 | 1.69671 | 31.70 |
| 20 | −38.1606 | 0.8000 | 1.86180 | 38.82 |
| 21 | 31.2754 | D21 | | |
| 22 | 55.8335 | 5.4512 | 1.90925 | 35.35 |
| 23 | −46.7074 | 0.9110 | | |
| 24 | −69.5328 | 1.3000 | 1.51004 | 68.81 |
| 25 | 38.2703 | 12.9013 | | |
| 26 | −23.6330 | 1.0000 | 1.84666 | 23.78 |
| 27 | −47.7349 | 15.0000 | | |
| 28 | ∞ | 2.5000 | 1.51633 | 64.14 |
| 29 | ∞ | 1.0000 | | |

(Various data)

| | INF | β1 | β2 |
|---|---|---|---|
| f | 92.7002 | 56.4352 | 38.4725 |
| β | 0 | −0.5 | −1.0 |
| Fno | 2.110 | 3.200 | 4.200 |
| ω | 12.5792 | 6.5626 | 3.7783 |
| Y | 21.633 | 21.633 | 21.633 |
| BF | 18.500 | 18.500 | 18.500 |
| TL | 134.619 | 134.619 | 145.676 |

(Variable interval)

| | INF | β1 | β2 |
|---|---|---|---|
| f | 92.7002 | 56.4352 | 38.4725 |
| Imaging distance | INF | 334.90 | 263.79 |
| D7 | 3.0674 | 18.3151 | 29.3727 |
| D11 | 29.5683 | 14.3206 | 3.2630 |
| D17 | 2.2000 | 10.2615 | 21.3192 |
| D21 | 10.6298 | 2.5682 | 2.5682 |

(Focal length of each lens group)

| Group | Surface number | Focal length |
|---|---|---|
| G1 | 1-7 | 65.4594 |
| G2 | 8-11 | −49.3120 |
| G3 | 12-17 | 36.1356 |
| G4 | 18-20 | −39.3439 |
| G5 | 21-26 | 267.9377 |

Second Example (1) Optical Configuration

Figure 5:
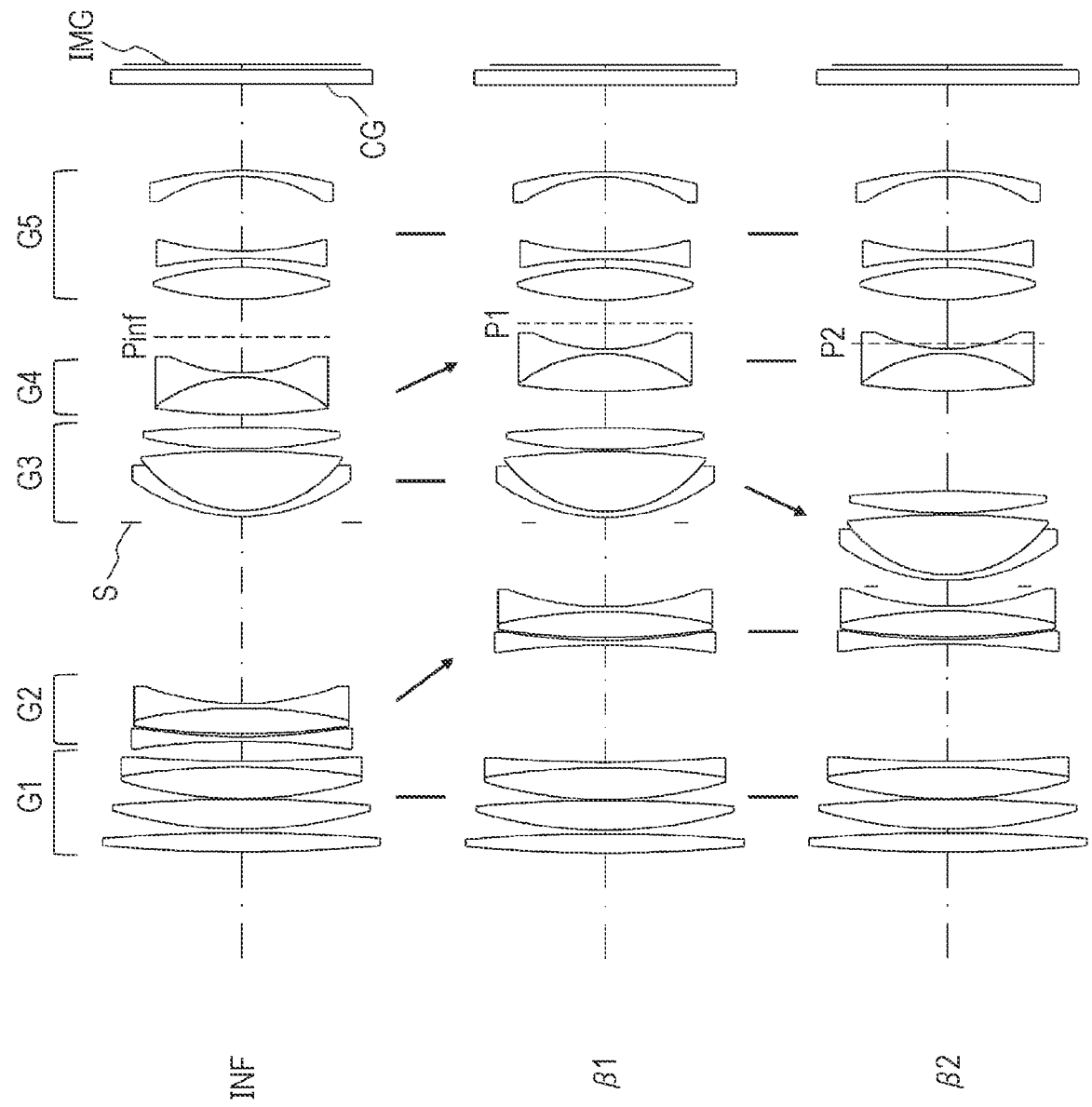
FIG. 5 is a lens cross-sectional view of an optical system of a second example of the present invention.

FIG. 5 is a lens cross-sectional view of the optical system of the second example according to the invention of the present application. As illustrated in FIG. 5, the optical system includes the first lens group G1 having positive refractive power, the second lens group G2 having negative refractive power, the third lens group G3 having positive refractive power, the fourth lens group G4 having negative refractive power, and the fifth lens group G5 having positive refractive power in order from the object side. An aperture stop S is disposed on the object side of the third lens group G3. The configuration of each lens group is as illustrated in the drawing.

In the optical system of the second example, the "imaging magnification β1" is −0.5, the "imaging magnification β2" is −0.8, and the imaging magnification β2 corresponds to the maximum imaging magnification βmax in the optical system. In the optical system, the subject is focused by moving the second lens group G2 and the fourth lens group G4 along the optical axis direction during the period from the infinite-distance object focusing state to the first short-distance object focusing state, and the first lens group G1, the third lens group G3, and the fifth lens group G5 are fixed in the optical axis direction during that period. The subject is focused by moving the third lens group G3 along the optical axis direction during the period from the first short-distance object focusing state to the second short-distance object focusing state, and the first lens group G1, the second lens group G2, the fourth lens group G4, and the fifth lens group G5 are fixed in the optical axis direction during that period. The second lens group G2 and the fourth lens group G4 are the first focus group, and the third lens group G3 is the second focus group.

(2) Numerical Value Example

Next, a numerical example of the optical system will be described. Hereinafter, surface data of the optical system, various data, a variable interval at the time of focusing, the focal length of each lens group, and aspherical data are presented.

In the field of "No." of the surface data, "ASPH" displayed in the field next to the surface number indicates that the surface is an asphere. The "aspherical data" indicates an aspherical coefficient of each asphere. However, the asphere is assumed to be defined by the following expression with x as a displacement amount from a surface vertex in the optical axis direction.

$$x = (h^2/r)/[1+\{1-(1+k)\times(h/r)^2\}^{1/2}] + A4 \times h^4 + A6 \times h^6 + A8 \times h^8 + A10 \times h^{10} + A12 \times h^{12}$$

In the above expression, h represents a height from the optical axis, r represents a paraxial curvature radius, k represents a cone coefficient, and An represents an n-th aspherical coefficient. "E±XX" represents an exponential notation and means "×10$^{\pm xx}$". Hereinafter, since the same is true for the aspherical surface, the description will be omitted.

Figure 6:
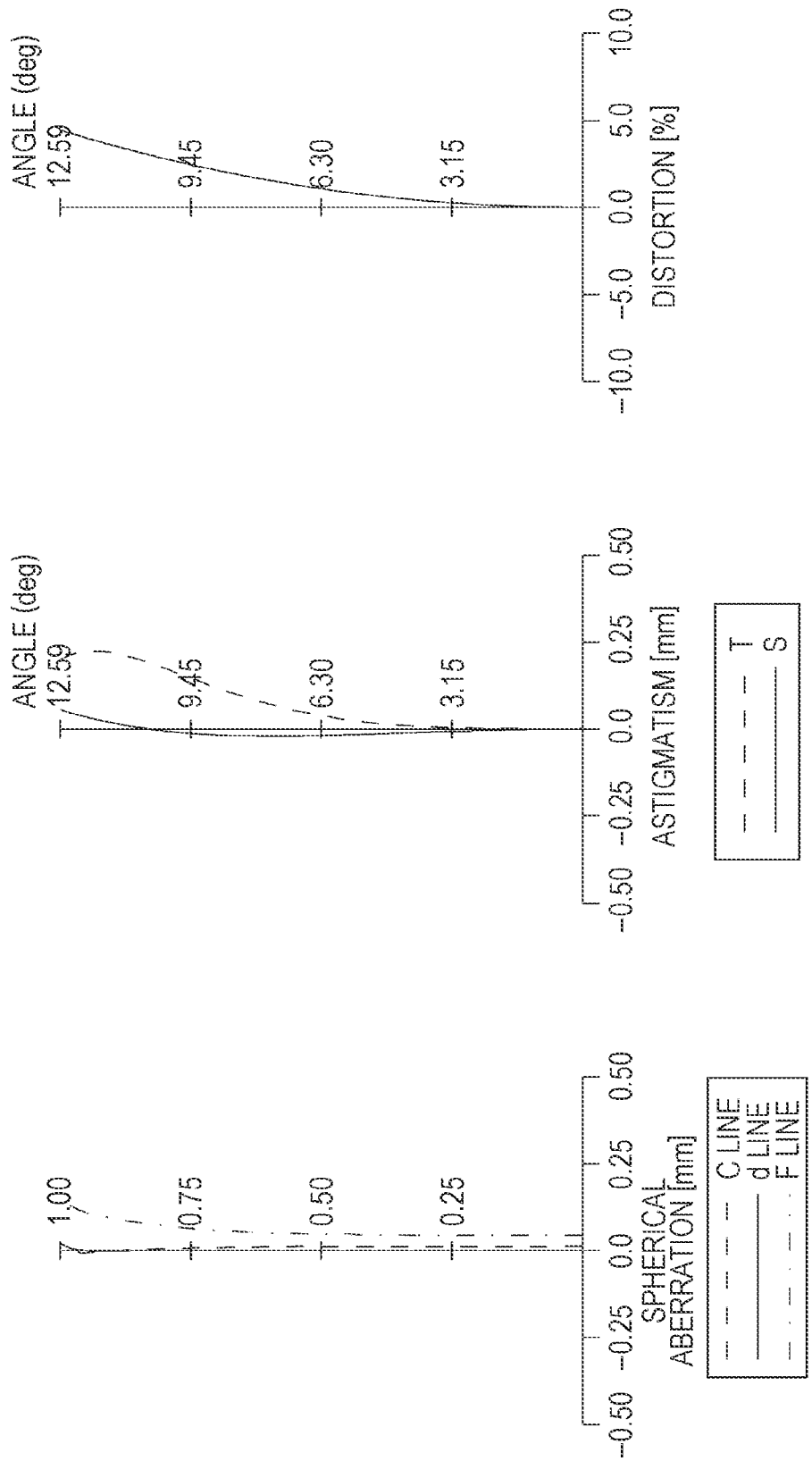
FIG. 6 is a spherical aberration diagram, an astigmatism diagram, and a distortion diagram in the infinite-distance object focusing state of the optical system of the second example.
Figure 7:
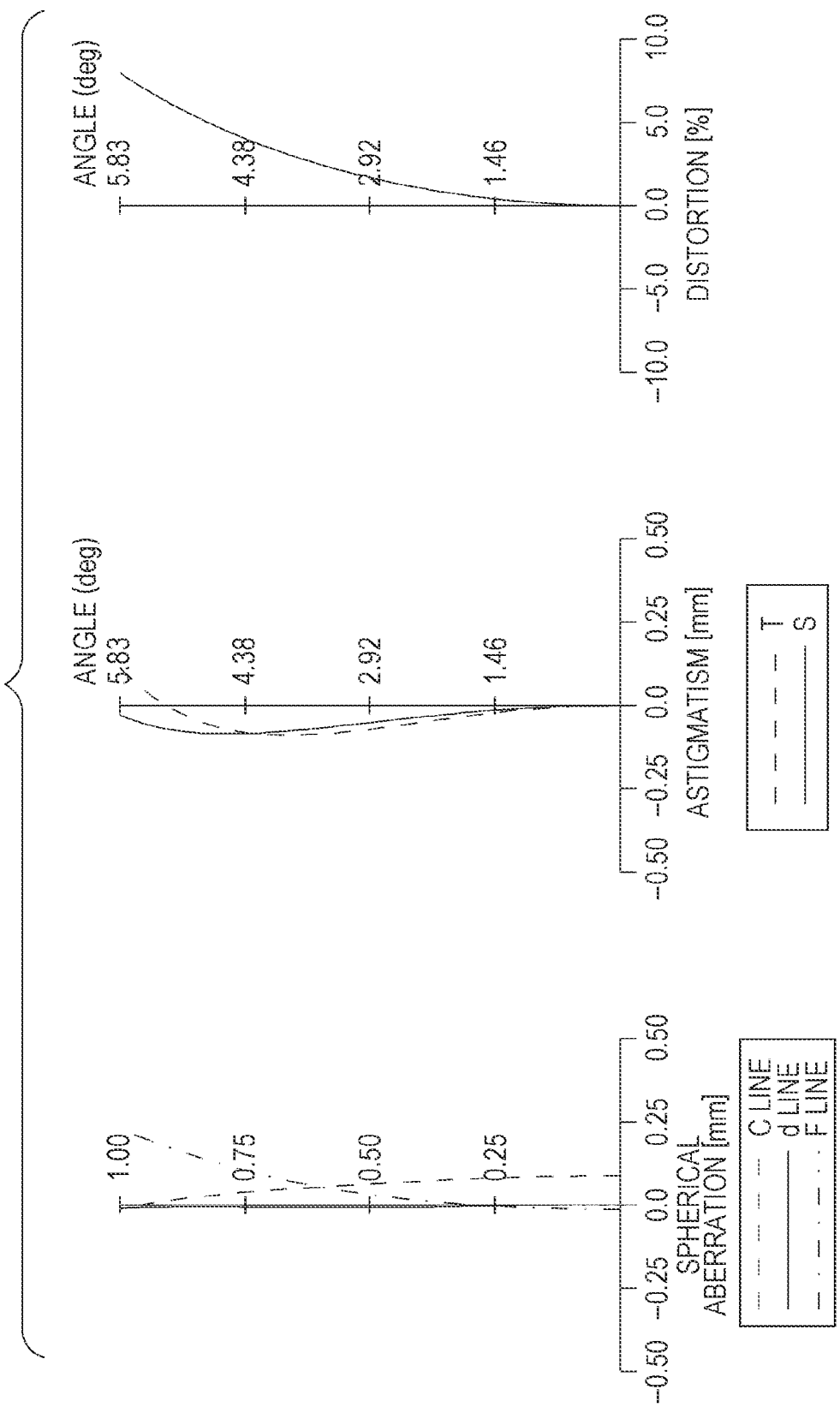
FIG. 7 is a spherical aberration diagram, an astigmatism diagram, and a distortion diagram in the first short-distance object focusing state of the optical system of the second example.
Figure 8:
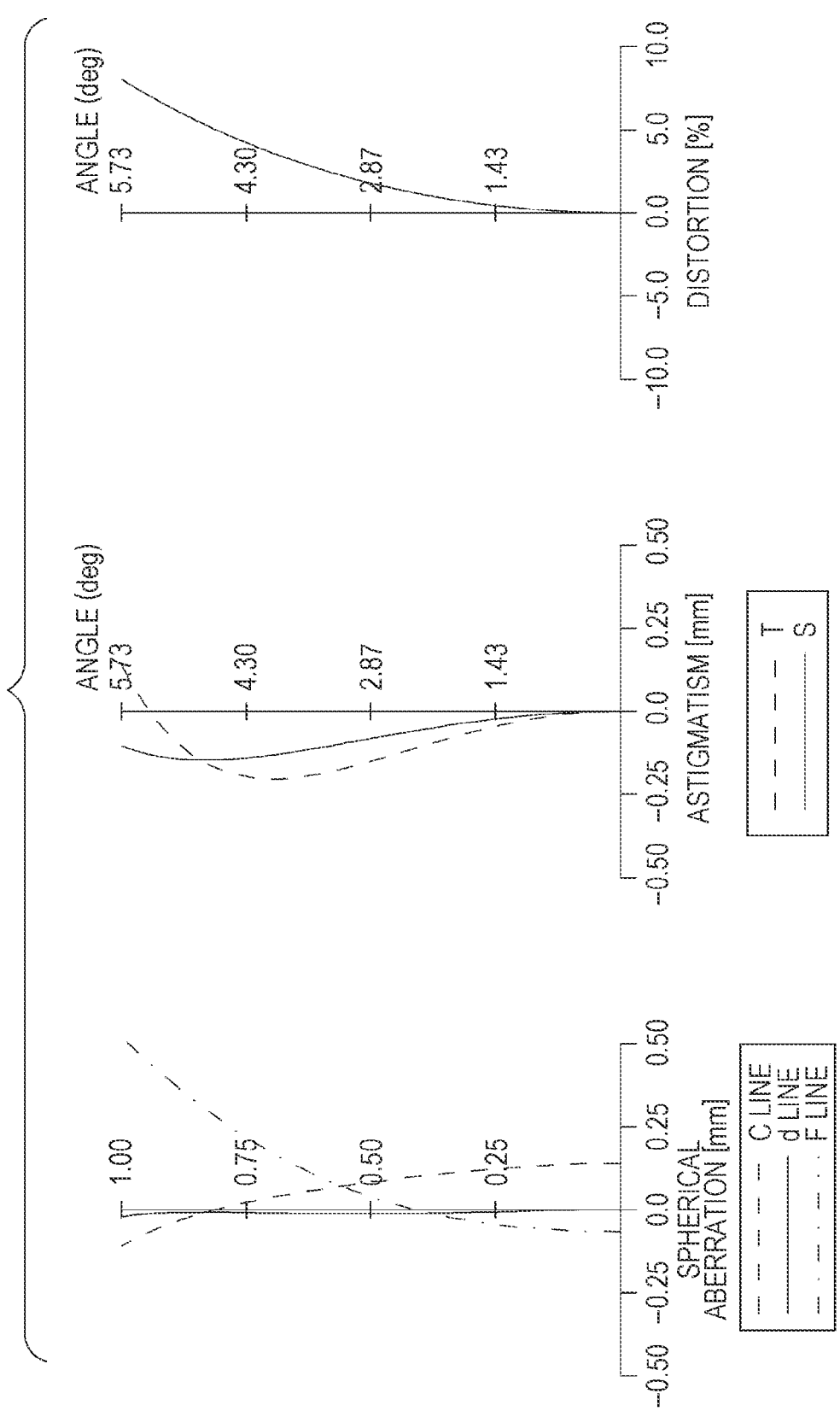
FIG. 8 is a spherical aberration diagram, an astigmatism diagram, and a distortion diagram in the second short-distance object focusing state of the optical system of the second example.

FIGS. 6, 7, and 8 illustrate longitudinal aberration diagrams of the optical system in the infinite-distance object focusing state, the first short-distance object focusing state (imaging magnification β1), and the second short-distance object focusing state (imaging magnification β2).

(Surface Data)

| No. | R | D | Nd | ABV |
|---|---|---|---|---|
| 1 | 268.6607 | 3.3383 | 1.76169 | 50.13 |
| 2 | −288.1781 | 0.6336 | | |
| 3 | 79.9614 | 5.1240 | 1.49700 | 81.61 |
| 4 | −257.8755 | 0.2000 | | |
| 5 | 74.5842 | 5.5062 | 1.59282 | 68.62 |
| 6 | −132.5628 | 1.0000 | 1.84666 | 23.78 |
| 7 | 243.9703 | D7 | | |
| 8 | −133.7219 | 0.8000 | 1.76665 | 49.89 |
| 9 | 102.8476 | 0.5442 | | |
| 10 | 133.0884 | 4.4475 | 1.92286 | 20.88 |
| 11 | −83.2619 | 0.8000 | 1.80817 | 44.37 |
| 12 | 49.2117 | D12 | | |
| 13STOP | ∞ | 1.0000 | | |
| 14 | 32.0346 | 1.0000 | 1.81052 | 24.88 |
| 15 | 21.5241 | 10.3613 | 1.51502 | 76.75 |
| 16 | −146.3724 | 0.4168 | | |
| 17ASPH | 84.8960 | 3.7046 | 1.57154 | 66.04 |
| 18 | −186.2521 | D18 | | |
| 19 | 106.0691 | 6.4737 | 1.76700 | 26.49 |
| 20 | −24.4352 | 0.8000 | 1.84872 | 33.72 |
| 21 | 28.9820 | D21 | | |
| 22 | 51.8305 | 5.5661 | 1.86838 | 38.28 |
| 23 | −47.7138 | 1.5121 | | |
| 24 | −76.4518 | 1.3000 | 1.51214 | 58.15 |
| 25 | 53.2939 | 12.9816 | | |
| 26 | −25.4575 | 1.0000 | 1.84666 | 23.78 |
| 27 | −58.6778 | 15.0000 | | |
| 28 | ∞ | 2.5000 | 1.51633 | 64.14 |
| 29 | ∞ | 1.0000 | | |

(Various data)

| | INF | β1 | β2 |
|---|---|---|---|
| f | 92.7001 | 61.6892 | 46.4780 |
| β | 0 | −0.5 | −0.8 |
| Fno | 2.1549 | 3.2000 | 3.8000 |
| ω | 12.5935 | 5.8338 | 5.7301 |
| Y | 21.633 | 21.633 | 21.633 |
| BF | 18.500 | 18.500 | 18.500 |
| TL | 136.903 | 136.903 | 136.903 |

(Variable interval)

| | INF | β1 | β2 |
|---|---|---|---|
| f | 92.7001 | 61.6892 | 46.4780 |
| Imaging distance | INF | 367.88 | 297.08 |
| D7 | 3.4132 | 20.3409 | 20.3409 |
| D12 | 31.4879 | 14.5603 | 3.4745 |
| D18 | 2.2000 | 6.4277 | 17.5134 |
| D21 | 12.7918 | 8.5641 | 8.5641 |

(Focal length of each lens group)

| Group | Surface number | Focal length |
|---|---|---|
| G1 | 1-7 | 61.2857 |
| G2 | 8-12 | −46.1949 |

-continued

|   | | |
|---|---|---|
| G3 | 13-18 | 42.3498 |
| G4 | 19-21 | −40.8445 |
| G5 | 22-27 | 125.6290 |

(Aspherical surface data)

| No. | K | A4 | A6 | A8 | A10 | A12 |
|---|---|---|---|---|---|---|
| 17 | 0.00000E+00 | 0.00000E+00 | 1.51299E−09 | 9.60398E−12 | −2.04325E−14 | 8.36539E−17 |

Third Example (1) Optical Configuration

Figure 9:
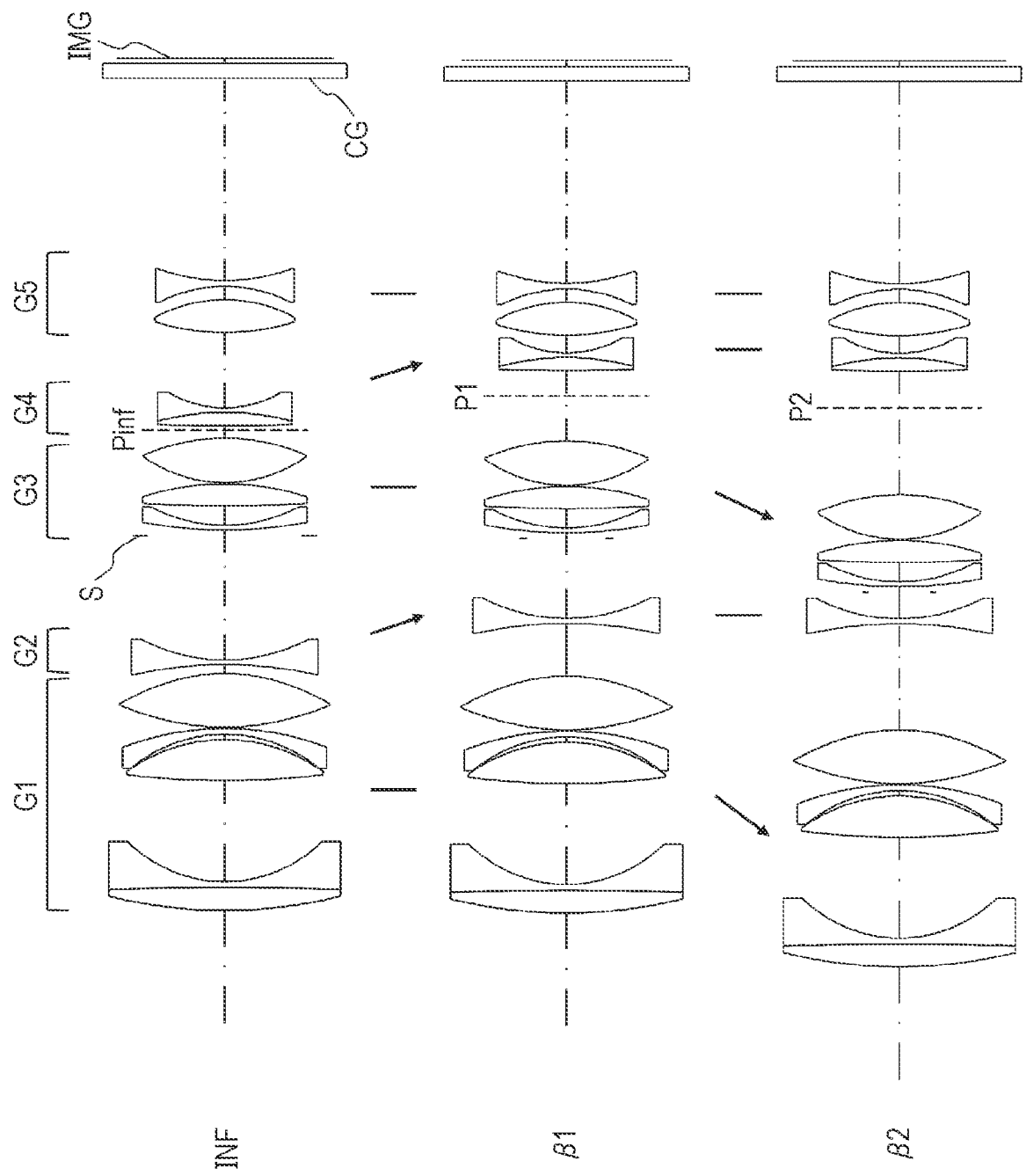
FIG. 9 is a lens cross-sectional view of an optical system of a third example of the present invention.

FIG. 9 is a lens cross-sectional view of the optical system of the third example according to the invention of the present application. As illustrated in FIG. 9, the optical system includes the first lens group G1 having positive refractive power, the second lens group G2 having negative refractive power, the third lens group G3 having positive refractive power, the fourth lens group G4 having negative refractive power, and the fifth lens group G5 having positive refractive power in order from the object side. An aperture stop S is disposed on the object side of the third lens group G3. The configuration of each lens group is as illustrated in the drawing.

In the optical system of the third example, the "imaging magnification $\beta 1$" is −1.0, the "imaging magnification $\beta 2$" is −2.0, and the imaging magnification $\beta 2$ corresponds to the maximum imaging magnification $\beta$max in the optical system. In the optical system, the subject is focused by moving the second lens group G2 and the fourth lens group G4 along the optical axis direction during the period from the infinite-distance object focusing state to the first short-distance object focusing state, and the first lens group G1, the third lens group G3, and the fifth lens group G5 are fixed in the optical axis direction during that period. The subject is focused by moving the first lens group G1 and the third lens group G3 along the optical axis direction during the period from the first short-distance object focusing state to the second short-distance object focusing state, and the second lens group G2, the fourth lens group G4, and the fifth lens group G5 are fixed in the optical axis direction during that period. The second lens group G2 and the fourth lens group G4 are the first focus group, and the first lens group G1 and the third lens group G3 are the second focus group.

(2) Numerical Value Example

Next, a numerical example of the optical system will be described. Hereinafter, surface data of the optical system, various data, a variable interval at the time of focusing, the focal length of each lens group, and aspherical data are presented.

Figure 10:
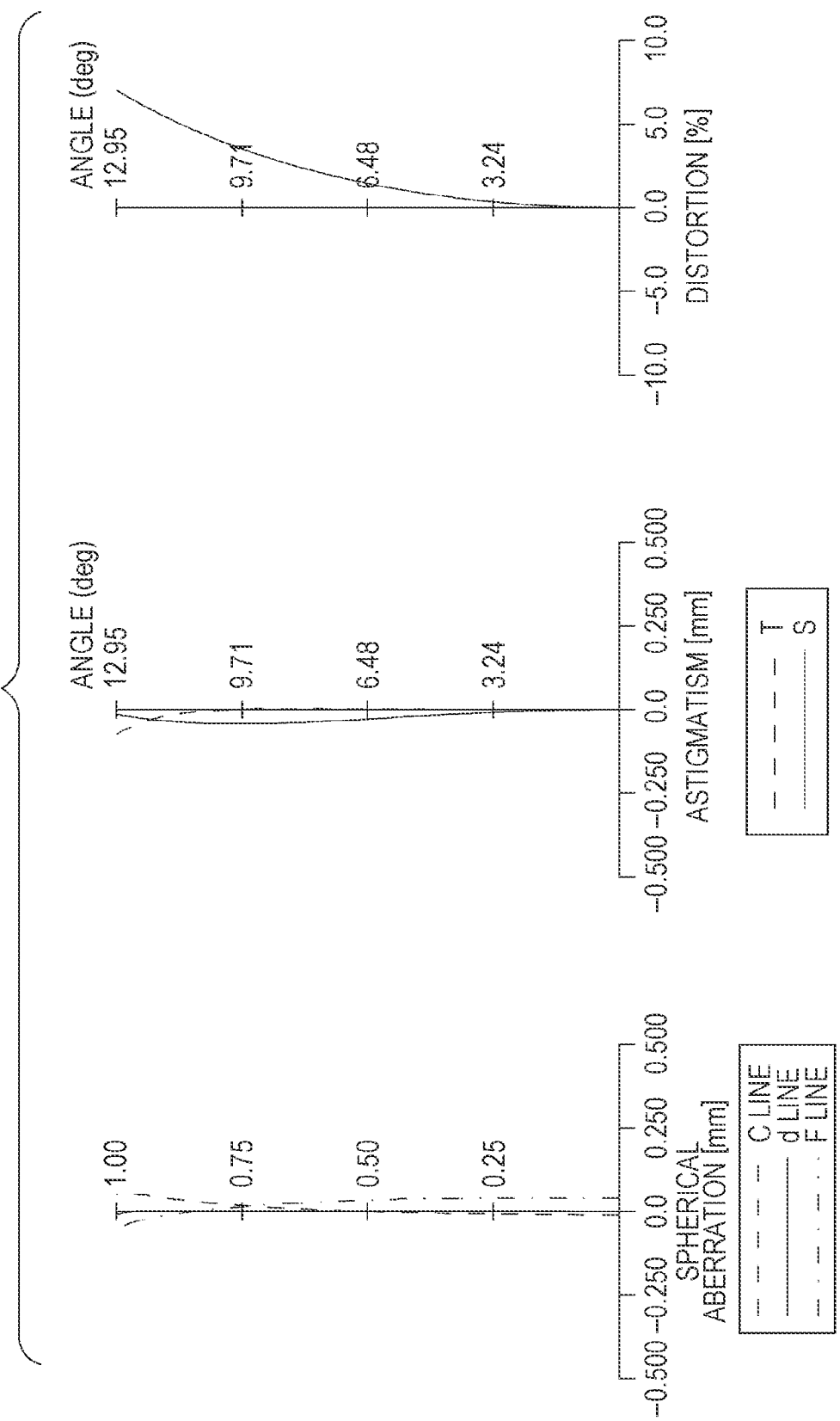
FIG. 10 is a spherical aberration diagram, an astigmatism diagram, and a distortion diagram in the infinite-distance object focusing state of the optical system of the third example.
Figure 11:
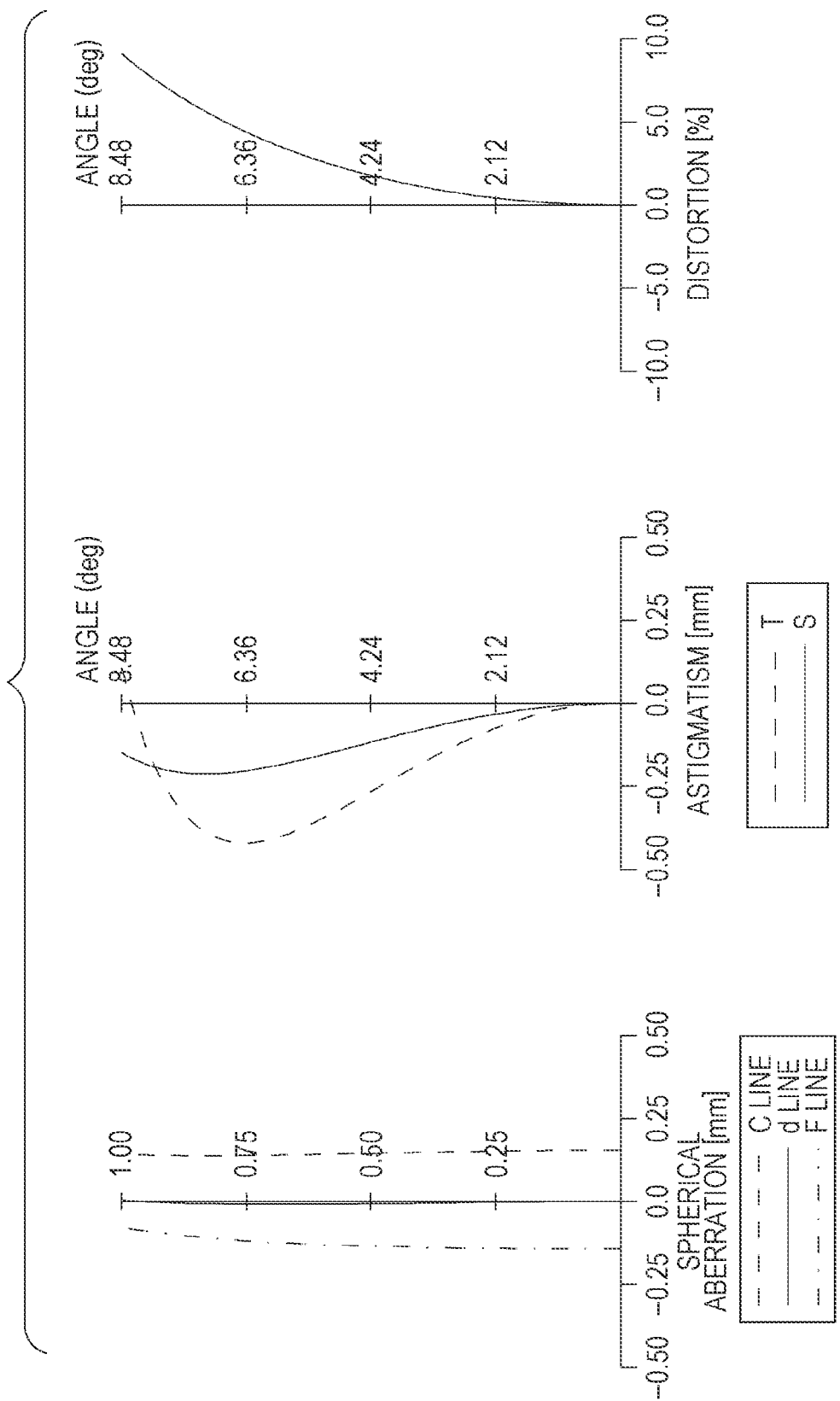
FIG. 11 is a spherical aberration diagram, an astigmatism diagram, and a distortion diagram in the first short-distance object focusing state of the optical system of the third example.
Figure 12:
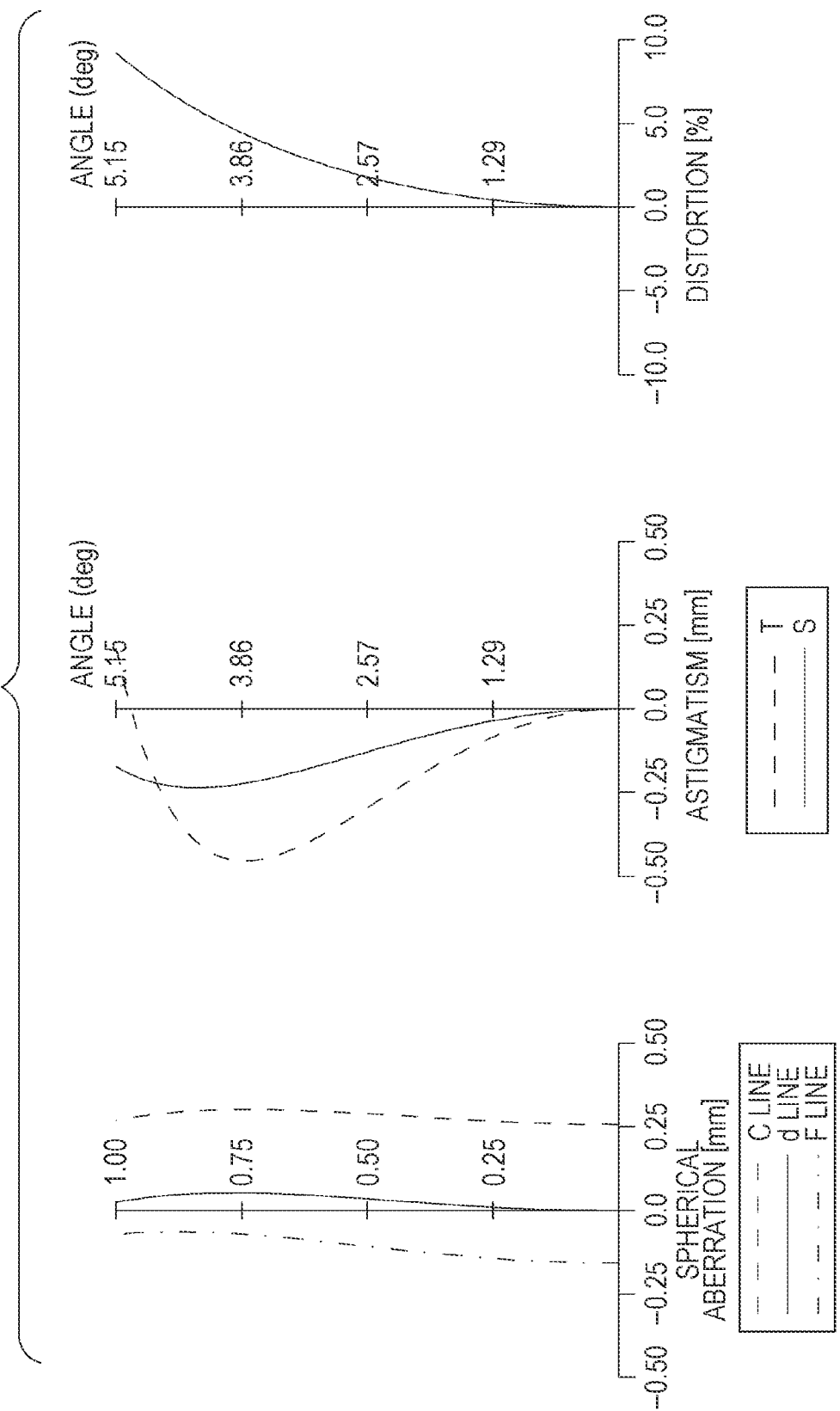
FIG. 12 is a spherical aberration diagram, an astigmatism diagram, and a distortion diagram in the second short-distance object focusing state of the optical system of the third example.

FIGS. 10, 11, and 12 illustrate longitudinal aberration diagrams of the optical system in the infinite-distance object focusing state, the first short-distance object focusing state (imaging magnification $\beta 1$), and the second short-distance object focusing state (imaging magnification $\beta 2$).

(Surface Data)

| No. | R | D | Nd | ABV |
|---|---|---|---|---|
| 1 | 98.1640 | 3.8639 | 1.92286 | 20.88 |
| 2 | −784.3577 | 1.0000 | 1.49700 | 81.61 |
| 3 | 27.5834 | 17.1841 | | |
| 4 | 163.4552 | 6.9948 | 1.49700 | 81.61 |
| 5 | −33.5015 | 0.9133 | | |
| 6 | −29.4497 | 1.0000 | 1.84666 | 23.78 |
| 7 | −57.3774 | 0.2000 | | |
| 8ASPH | 49.1121 | 9.1606 | 1.59282 | 68.62 |
| 9ASPH | −35.5559 | D9 | | |
| 10 | −85.4429 | 0.8000 | 1.55560 | 68.54 |
| 11 | 36.4897 | D11 | | |
| 12STOP | ∞ | 1.0000 | | |
| 13 | 90.9642 | 0.8000 | 1.84666 | 23.78 |
| 14 | 32.0307 | 3.2946 | | |
| 15 | 266.9782 | 3.7448 | 1.82748 | 39.97 |
| 16 | −54.3529 | 0.2000 | | |
| 17 | 28.2447 | 7.5604 | 1.43700 | 95.10 |
| 18 | −41.2961 | D18 | | |
| 19 | 463.2052 | 2.2000 | 1.84666 | 23.78 |
| 20 | −53.0340 | 0.8000 | 1.77899 | 48.54 |
| 21 | 22.5173 | D21 | | |
| 22 | 47.1906 | 5.6024 | 1.57279 | 42.61 |
| 23 | −29.6587 | 2.2428 | | |
| 24 | −29.5772 | 1.0000 | 1.56133 | 63.85 |
| 25 | 39.5661 | 34.3772 | | |
| 26 | ∞ | 2.5000 | 1.51633 | 64.14 |
| 27 | ∞ | 1.0000 | | |

-continued (Various data)

|  | INF | β1 | β2 |
|---|---|---|---|
| f | 87.8766 | 39.7703 | 25.9505 |
| β | 0 | −1.0 | −2.0 |
| Fno | 2.9000 | 5.8500 | 8.7000 |
| ω | 12.9523 | 8.4795 | 5.1482 |
| Y | 21.633 | 21.633 | 21.633 |
| BF | 37.877 | 37.877 | 37.877 |
| TL | 145.000 | 145.000 | 154.112 |

(Variable interval)

|  | INF | β1 | β2 |
|---|---|---|---|
| f | 87.8766 | 39.7703 | 25.9505 |
| Imaging distance | INF | 208.41 | 181.58 |
| D9 | 1.5000 | 8.9551 | 18.0666 |
| D11 | 21.0666 | 13.6116 | 4.5000 |
| D18 | 2.2000 | 11.9944 | 21.1060 |
| D21 | 12.7945 | 3.0000 | 3.0000 |

(Focal length of each lens group)

| Group | Surface number | Focal length |
|---|---|---|
| G1 | 1-9 | 35.2989 |
| G2 | 10-11 | −45.9144 |
| G3 | 12-18 | 33.6266 |
| G4 | 19-21 | −31.8769 |
| G5 | 22-25 | 777.5670 |

(Aspherical surface data)

| No. | K | A4 | A6 | A8 | A10 | A12 |
|---|---|---|---|---|---|---|
| 8 | 0.00000E+00 | −1.99576E−06 | −7.78596E−10 | −1.67883E−12 | 5.30277E−15 | 0.00000E+00 |
| 9 | 0.00000E+00 | 5.38841E−06 | −2.33885E−09 | 2.70945E−12 | 2.47653E−15 | 0.00000E+00 |

Fourth Example (1) Optical Configuration

Figure 13:
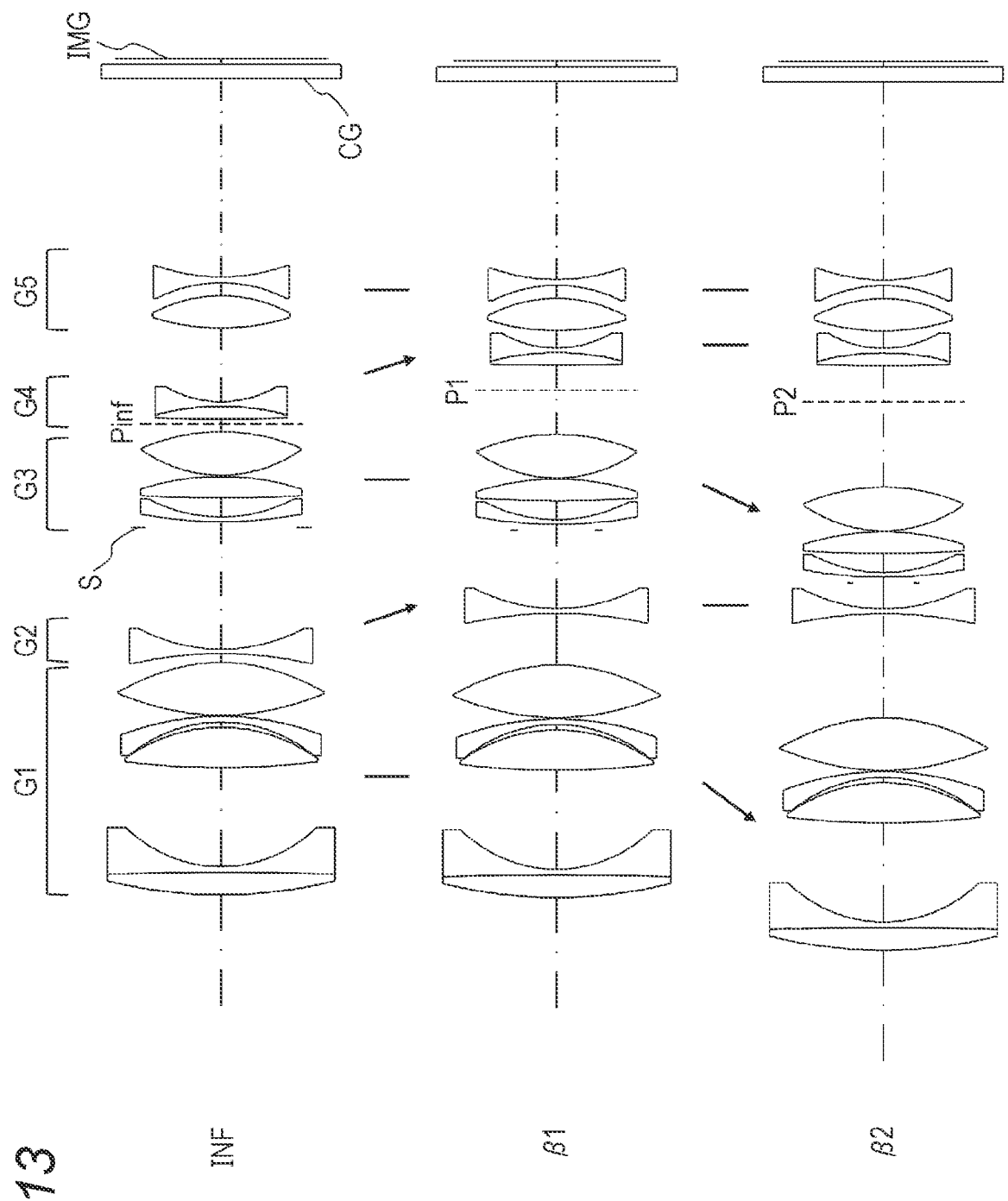
FIG. 13 is a lens cross-sectional view of an optical system of a fourth example of the present invention.

FIG. 13 is a lens cross-sectional view of the optical system of the fourth example according to the invention of the present application. As illustrated in FIG. 13, the optical system includes the first lens group G1 having positive refractive power, the second lens group G2 having negative refractive power, the third lens group G3 having positive refractive power, and the fourth lens group G4 having negative refractive power in order from the object side. An aperture stop S is disposed on the object side of the third lens group G3. The configuration of each lens group is as illustrated in the drawing.

In the optical system of the fourth example, the "imaging magnification β1" is −0.75, the "imaging magnification β2" is −1.5, and the imaging magnification β2 corresponds to the maximum imaging magnification βmax in the optical system. In the optical system, the subject is focused by moving the second lens group G2 and the fourth lens group G4 along the optical axis direction during the period from the infinite-distance object focusing state to the first short-distance object focusing state, and the first lens group G1 and the third lens group G3 are fixed in the optical axis direction during that period. The subject is focused by moving the first lens group G1 and the third lens group G3 along the optical axis direction during the period from the first short-distance object focusing state to the second short-distance object focusing state, and the second lens group G2 and the fourth lens group G4 are fixed in the optical axis direction during that period. The second lens group G2 and the fourth lens group G4 are the first focus group, and the first lens group G1 and the third lens group G3 are the second focus group.

(2) Numerical Value Example

Next, a numerical example of the optical system will be described. Hereinafter, surface data of the optical system, various data, a variable interval at the time of focusing, the focal length of each lens group, and aspherical data are presented.

Figure 14:
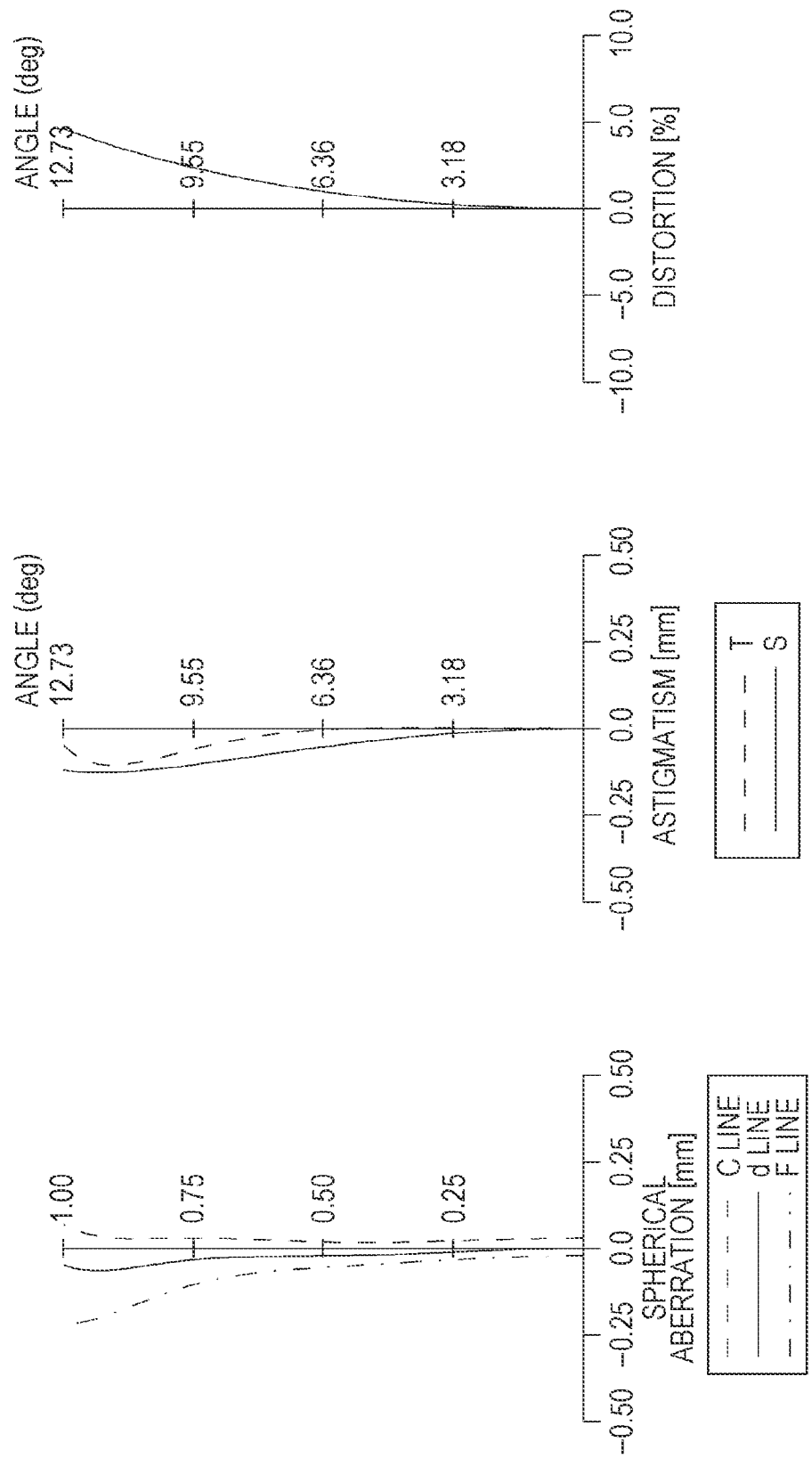
FIG. 14 is a spherical aberration diagram, an astigmatism diagram, and a distortion diagram in the infinite-distance object focusing state of the optical system of the fourth example.
Figure 15:
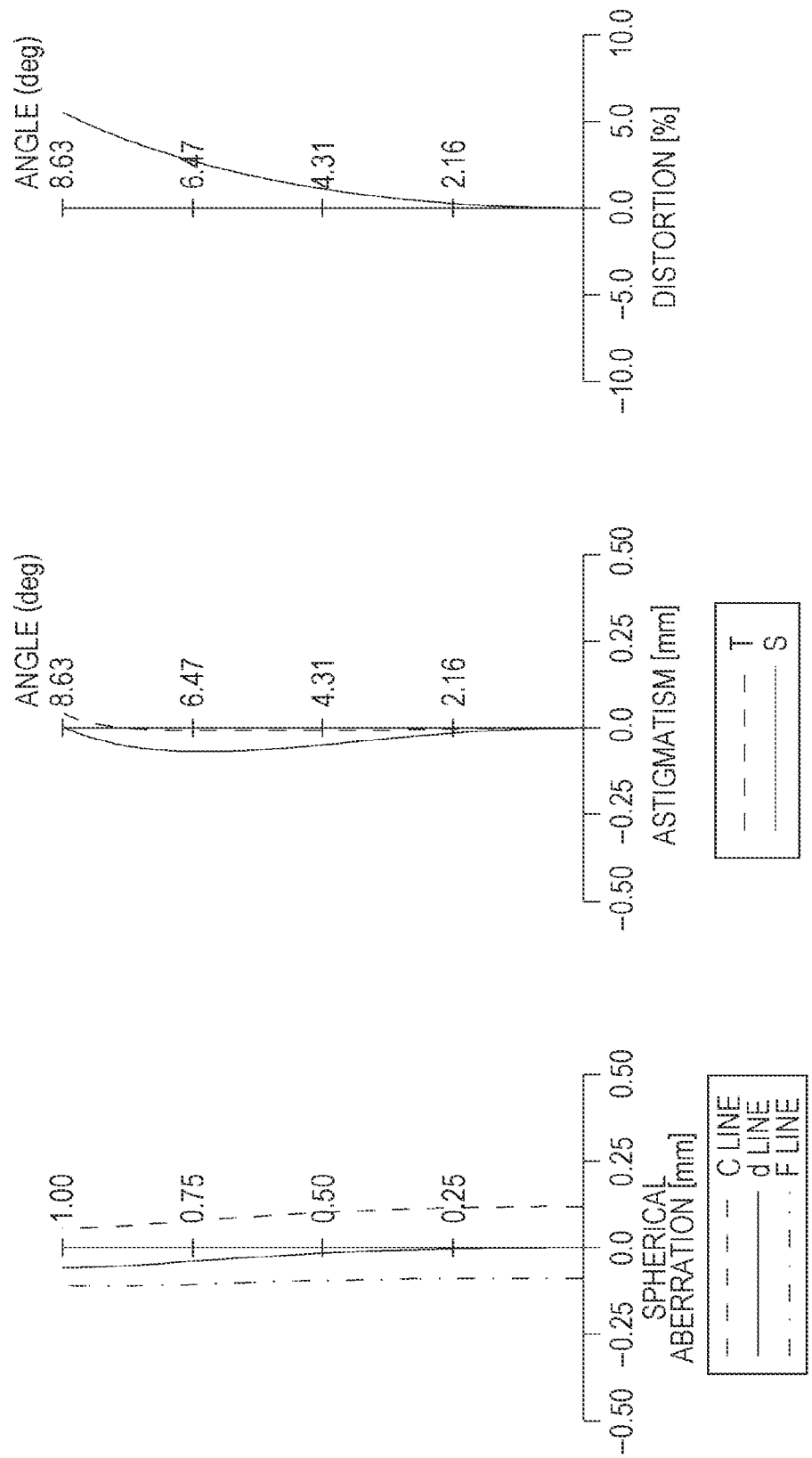
FIG. 15 is a spherical aberration diagram, an astigmatism diagram, and a distortion diagram in the first short-distance object focusing state of the optical system of the fourth example.

FIGS. 14, 15, and 16 illustrate longitudinal aberration diagrams of the optical system in the infinite-distance object focusing state, the first short-distance object focusing state (imaging magnification β1), and the second short-distance object focusing state (imaging magnification β2).

(Surface Data)

| No. | R | D | Nd | ABV |
|---|---|---|---|---|
| 1 | 212.2695 | 5.0000 | 1.92286 | 20.88 |
| 2 | 139.1666 | 1.0000 | 1.59282 | 68.62 |
| 3 | 36.1996 | 10.3366 |  |  |

-continued

| | | | | |
|---|---|---|---|---|
| 4 | 216.2681 | 6.0443 | 1.49700 | 81.61 |
| 5 | −37.8837 | 2.2524 | | |
| 6 | −28.7055 | 0.8000 | 1.84666 | 23.78 |
| 7 | −50.9510 | 0.2000 | | |
| 8ASPH | 43.9348 | 12.0000 | 1.49700 | 81.61 |
| 9ASPH | −31.3294 | D9 | | |
| 10 | −98.0288 | 0.8000 | 1.49700 | 81.61 |
| 11ASPH | 43.4918 | D11 | | |
| 12STOP | ∞ | 1.0000 | | |
| 13 | 128.6684 | 0.8000 | 1.84052 | 25.16 |
| 14 | 34.3070 | 2.7517 | | |
| 15 | −655.0362 | 2.7599 | 1.90043 | 37.37 |
| 16 | −60.4366 | 2.7808 | | |
| 17 | 39.2806 | 5.8311 | 1.49700 | 81.61 |
| 18 | −37.3238 | D18 | | |
| 19 | −48.5273 | 2.2089 | 1.84666 | 23.78 |
| 20 | −30.3491 | 0.8000 | 1.49700 | 81.61 |
| 21 | 30.5832 | D21 | | |
| 22 | ∞ | 2.5000 | 1.51633 | 64.14 |
| 23 | ∞ | 1.0000 | | |

(Various data)

| | INF | β1 | β2 |
|---|---|---|---|
| f | 91.6041 | 50.1114 | 35.1898 |
| β | 0 | −0.75 | −1.5 |
| Fno | 2.9100 | 5.0000 | 6.5000 |
| ω | 12.7285 | 8.6295 | 5.5211 |
| Y | 21.633 | 21.633 | 21.633 |
| BF | 53.033 | 40.589 | 40.589 |
| TL | 143.520 | 143.520 | 154.229 |

(Variable interval)

| | INF | β1 | β2 |
|---|---|---|---|
| f | 91.6041 | 50.1114 | 35.1898 |
| Imaging distance | INF | 240.97 | 201.73 |
| D9 | 4.1722 | 14.2867 | 24.9956 |
| D11 | 23.4275 | 13.3130 | 2.6041 |
| D18 | 5.5222 | 17.9655 | 28.6744 |
| D21 | 49.5326 | 37.0893 | 37.0893 |

(Focal length of each lens group)

| Group | Surface number | Focal length |
|---|---|---|
| G1 | 1-9 | 43.5649 |
| G2 | 10-11 | −60.5025 |
| G3 | 12-18 | 41.1919 |
| G4 | 19-21 | −44.7940 |

(Aspherical surface data)

| No. | K | A4 | A6 | A8 | A10 | A12 |
|---|---|---|---|---|---|---|
| 8 | 0.00000E+00 | −3.39392E−06 | −2.03399E−09 | 1.64767E−12 | −3.05491E−15 | 0.00000E+00 |
| 9 | 0.00000E+00 | 6.07741E−06 | −1.25563E−09 | 4.83644E−12 | −1.70952E−15 | 0.00000E+00 |
| 11 | 0.00000E+00 | −2.41579E−06 | −5.58930E−11 | 5.89953E−12 | −2.24425E−14 | 0.00000E+00 |

TABLE 1

| | First example | Second example | Third example | Fourth example |
|---|---|---|---|---|
| β1 | −0.5 | −0.5 | −1.0 | −0.75 |
| β2 | −1.0 | −0.8 | −2.0 | −1.5 |
| Pinf | −44.94 | −47.77 | −63.00 | −68.52 |
| P1 | −41.99 | −45.99 | −57.42 | −60.65 |
| P2 | −44.13 | −48.72 | −59.13 | −63.58 |

According to the invention of the present application, it is possible to provide an optical system and an imaging apparatus that have a larger aperture and a higher imaging magnification while maintaining a small overall size.

What is claimed is:

1. An optical system including a plurality of lens groups in which an interval between adjacent lens groups changes when focusing, and an aperture stop, and when intervals between an exit pupil of an on-axis ray by the aperture stop and an image plane in an infinite-distance object focusing state, a first short-distance object focusing state in which an imaging magnification is β1, and a second short-distance object focusing state in which an imaging magnification is β2 are Pinf, P1, and P2, respectively, the optical system satisfies following conditions:

$$|\beta1|<|\beta2| \quad (1)$$

$$|Pinf|<|P1| \quad (2)$$

$$|P2|<|P1| \quad (3).$$

2. The optical system according to claim 1, wherein a lens group arranged on a most image plane side is fixed in an optical axis direction when focusing.

3. The optical system according to claim 1, wherein following conditions are satisfied:

$$|\beta1|>0.2 \quad (4)$$

$$|\beta2|\geq 0.8 \quad (5).$$

4. The optical system according to claim 1, wherein a lens group arranged on a most object side is fixed in an optical axis direction during a period from the infinite-distance object focusing state to the first short-distance object focusing state.

5. The optical system according to claim 1, wherein focusing is performed by moving, in an optical axis direction, a lens group including a single lens element during a period from the infinite-distance object focusing state to the first short-distance object focusing state.

6. The optical system according to claim 1, wherein during a period from the infinite-distance object focusing state to the first short-distance object focusing state, focusing is performed by moving two lens groups in an optical axis direction, and the aperture stop is disposed between these two lens groups.

7. The optical system according to claim 1, wherein focusing is performed by moving a plurality of the lens groups with a same locus along an optical axis direction during a period from the first short-distance object focusing state to the second short-distance object focusing state.

8. The optical system according to claim 1 comprising:
a first focus group that moves along an optical axis direction during a period from the infinite-distance object focusing state to the first short-distance object focusing state, and a second focus group that moves along an optical axis direction during a period from the first short-distance object focusing state to the second short-distance object focusing state, wherein
the second focus group is fixed in an optical axis direction during a period from the infinite-distance object focusing state to the first short-distance object focusing state, and the first focus group is fixed in an optical axis direction during a period from the first short-distance object focusing state to the second short-distance object focusing state.

9. An imaging apparatus comprising: the optical system according to claim 1; and an image sensor that converts an optical image formed by the optical system into an electrical signal.

* * * * *